US010619019B2

(12) United States Patent
Lipscomb et al.

(10) Patent No.: US 10,619,019 B2
(45) Date of Patent: *Apr. 14, 2020

(54) ACRYLIC POLYVINYL ACETAL FILMS, COMPOSITION, AND HEAT BONDABLE ARTICLES

(71) Applicant: 3M INNOVATIVE PROPERTIES COMPANY, St. Paul, MN (US)

(72) Inventors: Corinne E. Lipscomb, St. Paul, MN (US); Mary M. Caruso Dailey, Maplewood, MN (US); Jonathan E. Janoski, Woodbury, MN (US); Anthony F. Schultz, Forest Lake, MN (US)

(73) Assignee: 3M Innovative Properties Company, St. Paul, MN (US)

(*) Notice: Subject to any disclaimer, the term of this patent is extended or adjusted under 35 U.S.C. 154(b) by 183 days.

This patent is subject to a terminal disclaimer.

(21) Appl. No.: 15/533,398

(22) PCT Filed: Dec. 7, 2015

(86) PCT No.: PCT/US2015/064219
§ 371 (c)(1),
(2) Date: Jun. 6, 2017

(87) PCT Pub. No.: WO2016/094280
PCT Pub. Date: Jun. 16, 2016

(65) Prior Publication Data
US 2017/0362399 A1 Dec. 21, 2017

Related U.S. Application Data

(60) Provisional application No. 62/088,963, filed on Dec. 8, 2014.

(51) Int. Cl.
| C08J 5/18 | (2006.01) |
| B32B 27/30 | (2006.01) |
| B32B 27/08 | (2006.01) |
| B32B 27/00 | (2006.01) |

(52) U.S. Cl.
CPC ........... *C08J 5/18* (2013.01); *B32B 27/00* (2013.01); *B32B 27/08* (2013.01); *B32B 27/30* (2013.01); *B32B 27/304* (2013.01); *B32B 27/306* (2013.01); *B32B 27/308* (2013.01); *B32B 2250/246* (2013.01); *B32B 2255/10* (2013.01); *B32B 2255/26* (2013.01); *B32B 2307/31* (2013.01); *B32B 2307/54* (2013.01); *B32B 2307/546* (2013.01); *B32B 2307/732* (2013.01); *C08J 2333/08* (2013.01); *C08J 2429/14* (2013.01)

(58) Field of Classification Search
CPC ...... C08J 5/18; C08J 2333/08; C08J 2429/14; B32B 27/304; B32B 27/08; B32B 27/308; B32B 27/306; B32B 27/00; B32B 27/30; B32B 2307/54; B32B 2307/31; B32B 2307/732; B32B 2307/546; B32B 2255/26; B32B 2255/10; B32B 2250/246
See application file for complete search history.

(56) References Cited

U.S. PATENT DOCUMENTS

| 2,736,721 A | 2/1956 | Dexter |
| RE24,906 E | 12/1960 | Ulrich |
| 3,250,808 A | 5/1966 | Moore |
| 3,277,091 A | 10/1966 | Schmelzer |
| 3,591,531 A | 7/1971 | Schroeder |
| 3,661,588 A | 5/1972 | Chang |
| 3,691,140 A | 9/1972 | Silver |
| 3,929,934 A | 12/1975 | Moore |
| 4,000,356 A | 12/1976 | Weisgerber |
| 4,181,752 A | 1/1980 | Martens |
| 4,243,500 A | 1/1981 | Glennon |
| 4,330,590 A | 5/1982 | Vesley |
| 4,418,120 A | 11/1983 | Kealy |
| 4,737,577 A | 4/1988 | Brown |
| 4,833,179 A | 5/1989 | Young |
| 4,855,184 A | 8/1989 | Klun |
| 4,894,259 A | 1/1990 | Kuller |
| 4,968,562 A | 11/1990 | Delgado |
| 4,994,322 A | 2/1991 | Delgado |

(Continued)

FOREIGN PATENT DOCUMENTS

| CN | 1575099 | 2/2005 |
| CN | 101817975 | 9/2010 |

(Continued)

OTHER PUBLICATIONS

Aran, "Tailoring the Swelling and Glass-Transition Temperature of Acrylonitrile/Hydroxyethyl Acrylate Copolymers," Journal of Applied Polymer Science, Journal of Applied Polymer Science, 2010, vol. 116, pp. 628-635.
BUTVAR®, Polyvinyl Butyral Resin Properties and Uses, © Solutia Inc., 2006, pp. 1-32.
Eastman, Product Data Sheet, "Tenite™ Propionate 307E4000018 Clear, Trsp", 2000 [retrieved from the internet on May 25, 2017], URL <http://ws.eastman.com/ProductCatalogApps/PageControllers/ProdDatasheet_PC.aspx? Pro>, pp. 1-2.
"Intro in Properties and Applications," Specialized in Specialties, KSE® Mowital, pp. 1-84.
Kuraray, ®Mowital ®Pioloform, Technical Data Sheet, pp. 1-2.
Pocius, Adhesion and Adhesive Technology $3^{rd}$ Ed., 2012, pp. 287-291.

(Continued)

Primary Examiner — Robert S Jones
(74) Attorney, Agent, or Firm — Carolyn A. Fischer

(57) ABSTRACT

A film is described comprises a (meth)acrylic polymer and a polyvinyl acetal (e.g. butyral) resin. The film has a tensile elastic modulus of at least 1 MPa at 25° C. and 1 hertz and a glass transition temperature (i.e. Tg) less than 30 C. The film typically comprises photoinitiator as a result of the method by which the film was made. In one embodiment, the film is heat bondable and further comprising a backing.

21 Claims, No Drawings

(56) References Cited

U.S. PATENT DOCUMENTS

| | | |
|---|---|---|
| 5,141,790 A | 8/1992 | Calhoun |
| 5,209,971 A | 5/1993 | Babu |
| 5,214,100 A | 5/1993 | Abele |
| 5,296,277 A | 3/1994 | Wilson |
| 5,362,516 A | 11/1994 | Wilson |
| 5,461,134 A | 10/1995 | Leir |
| 5,506,279 A | 4/1996 | Babu |
| 5,623,010 A | 4/1997 | Groves |
| 5,677,376 A | 10/1997 | Groves |
| 5,820,957 A | 10/1998 | Schroeder |
| 5,902,836 A | 5/1999 | Bennett |
| 6,113,679 A | 9/2000 | Adkins |
| 6,232,359 B1 | 5/2001 | Christian |
| 6,319,985 B1 | 11/2001 | Bruning |
| 6,423,381 B1 | 7/2002 | Colton |
| 6,498,202 B1 | 12/2002 | Sun |
| 6,576,396 B1 | 6/2003 | Leichsenring |
| 6,660,388 B2 | 12/2003 | Liu |
| 6,778,240 B2 | 8/2004 | Nakamura et al. |
| 6,806,320 B2 | 10/2004 | Everaerts |
| 6,846,075 B2 | 1/2005 | Ylitalo |
| 6,881,458 B2 | 4/2005 | Ludwig |
| 7,072,333 B2 | 7/2006 | Ahn |
| 7,101,618 B2 | 9/2006 | Coggio |
| 7,173,778 B2 | 2/2007 | Jing |
| 7,385,020 B2 | 6/2008 | Anderson |
| 7,416,763 B2 | 8/2008 | Kanda |
| 7,473,462 B2 | 1/2009 | Coggio |
| 7,718,264 B2 | 5/2010 | Klun |
| 8,372,517 B2 | 2/2013 | Tokuchi |
| 8,455,099 B2 | 6/2013 | Chevalier |
| 8,568,849 B2 | 10/2013 | Shi |
| 8,628,855 B2 | 1/2014 | Hao |
| 8,634,146 B2 | 1/2014 | David |
| 9,175,181 B2 | 11/2015 | Butler |
| 9,447,218 B2 | 9/2016 | Mikayama |
| 9,969,911 B2 | 5/2018 | Nakada |
| 2003/0111519 A1 | 6/2003 | Kinney |
| 2003/0224150 A1 | 12/2003 | Ludwig |
| 2004/0077775 A1 | 4/2004 | Audenaert |
| 2005/0003222 A1 | 1/2005 | Everaerts |
| 2007/0032587 A1 | 2/2007 | Nakashima |
| 2007/0148600 A1* | 6/2007 | Hasegawa ............. G03F 7/0388 430/311 |
| 2008/0000583 A1 | 1/2008 | Steelman |
| 2009/0017313 A1 | 1/2009 | Outlaw |
| 2009/0053448 A1 | 2/2009 | Paiva |
| 2010/0015400 A1 | 1/2010 | Tokuchi |
| 2010/0055418 A1 | 3/2010 | Takamatsu |
| 2010/0058656 A1 | 3/2010 | Chevalier |
| 2011/0034618 A1 | 2/2011 | Register |
| 2011/0076613 A1 | 3/2011 | Yoshida |
| 2011/0112247 A1 | 5/2011 | Tokuchi |
| 2011/0282000 A1 | 11/2011 | Hayes |
| 2012/0003468 A1 | 1/2012 | Husemann |
| 2012/0231269 A1 | 9/2012 | Nakagawa |
| 2012/0260975 A1 | 10/2012 | Gerard |
| 2012/0288692 A1 | 11/2012 | Broyles |
| 2013/0004766 A1 | 1/2013 | Abe |
| 2013/0310509 A1 | 11/2013 | Hannemann |
| 2014/0030538 A1 | 1/2014 | Boutillier |
| 2015/0175458 A1 | 6/2015 | Momiyama |
| 2015/0240067 A1 | 8/2015 | Nagai |
| 2016/0053039 A1 | 2/2016 | Mikayama |
| 2016/0289440 A1 | 10/2016 | Janoski |

FOREIGN PATENT DOCUMENTS

| | | |
|---|---|---|
| CN | 103589320 | 2/2014 |
| DE | 102005023405 | 1/2007 |
| EP | 447115 | 9/1991 |
| EP | 0570254 | 11/1993 |
| EP | 0570515 | 11/1993 |
| EP | 659844 | 6/1995 |
| EP | 617708 | 9/1996 |
| EP | 1038665 | 9/2000 |
| EP | 2080786 | 7/2009 |
| EP | 2163571 | 3/2010 |
| EP | 2284221 | 2/2011 |
| EP | 2623525 | 8/2013 |
| EP | 2937733 | 10/2015 |
| JP | S64-1737 | 1/1989 |
| JP | 5255390 | 10/1993 |
| JP | 09-324165 | 12/1997 |
| JP | 10-168271 | 6/1998 |
| JP | 2003-040653 | 2/2003 |
| JP | 2005-015654 | 1/2005 |
| JP | 2005-054065 | 3/2005 |
| JP | 2007-023145 | 2/2007 |
| JP | 2007-277050 | 10/2007 |
| JP | 2008-055690 | 3/2008 |
| JP | 2008-106254 | 5/2008 |
| JP | 2010-083909 | 9/2008 |
| JP | 2009-102467 | 5/2009 |
| JP | 2011-012127 | 1/2011 |
| JP | 5610604 | 10/2014 |
| JP | 2014-224234 | 12/2014 |
| KR | 0148852 | 10/1998 |
| KR | 101289947 | 7/2013 |
| WO | WO 1992-13924 | 8/1992 |
| WO | WO 1995-013331 | 5/1995 |
| WO | WO 1996-001687 | 1/1996 |
| WO | WO 1998-015601 | 4/1998 |
| WO | WO 1998-029516 | 7/1998 |
| WO | WO 1999-003907 | 1/1999 |
| WO | WO 2000-012574 | 3/2000 |
| WO | WO 2003-012459 | 2/2003 |
| WO | WO 2004-044019 | 5/2004 |
| WO | WO 2005-023913 | 3/2005 |
| WO | WO 2006-094177 | 9/2006 |
| WO | WO 2006-102383 | 9/2006 |
| WO | WO 2009-041017 | 4/2009 |
| WO | WO 2009-146227 | 12/2009 |
| WO | WO 2010-078071 | 7/2010 |
| WO | WO 2010-078346 | 7/2010 |
| WO | WO 2010-141345 | 12/2010 |
| WO | WO 2011-042665 | 4/2011 |
| WO | WO 2011-088096 | 7/2011 |
| WO | WO 2011-094342 | 8/2011 |
| WO | WO 2011-094350 | 8/2011 |
| WO | WO 2012-069587 | 5/2012 |
| WO | WO 2012-136941 | 10/2012 |
| WO | WO 2012-148421 | 11/2012 |
| WO | WO 2013-019699 | 2/2013 |
| WO | WO 2013-019706 | 2/2013 |
| WO | WO 2013-019766 | 2/2013 |
| WO | WO 2013-019772 | 2/2013 |
| WO | WO 2014-050746 | 3/2014 |
| WO | WO 2014-123766 | 8/2014 |
| WO | WO 2014-172185 | 10/2014 |
| WO | WO 2014-179432 | 11/2014 |
| WO | WO 2015-064219 | 5/2015 |
| WO | WO 2015-157350 | 10/2015 |
| WO | WO 2015-187770 | 12/2015 |
| WO | WO 2016-094112 | 6/2016 |
| WO | WO 2016-094277 | 6/2016 |
| WO | WO 2017-112564 | 6/2017 |

OTHER PUBLICATIONS

"Polyvinyl Butyral of Superior Quality," Kuraray Specialties Europe GmbH, ®Mowital, 2003, pp. 1-36.

Sideridou-Karayannidou, "Synthesis and Characterization of Copolymers of N-Vinylcarbazole and N, N-Dimethylaminoethyl Acrylate," Polymer, 1999, vol. 40, No. 17, pp. 4915-4922.

Wakabayashi, "Studies on s—Triazines. I. Contrimerization of Trichloroacetonitrile With Other Nitriles," Bulletin of the Chemical Society of Japan, 1969, vol. 42, pp. 2924-2930.

International Search Report for PCT International Application No. PCT/US2015/064215, dated Mar. 18, 2016, 5 pages.

International Search Report for PCT International Application No. PCT/US2015/064219, dated Mar. 18, 2016, 4 pages.

(56) References Cited

OTHER PUBLICATIONS

International Search Report for PCT International Application No. PCT/US2015/063073, dated Feb. 26, 2016, 4 pages.
3M™ Screen Printing Ink 1905 Black, Apr. 19, 2016, 1page.
3M™ Screen Printing UV Ink 9802 Opaque Black, Jan. 19, 2016, pp. 2-3.
Carbodeon, "Carbodeon company presentation on nanodiamond additives to fluoropolymer coatings and composites", 20 pages.
FG00099—Vutek® GSLXR 3M Superflex Ink, Mar. 17, 2015, 3pgs.
HP Safety Data Sheet, C4940 Series, 9380 Version No. 02, May 14, 2015, 1pg.
"Nanodiamond dispersion for solvent based fluoropolymer coatings", Datasheet, 2016, Diamond Additive, 1 page.
ROHM and HAAS, "Pressure sensitive adhesives", 2006, pp. 01-02.
Roland Data Sheet, ECO-SOL MAX2, ESL4-CY, ECO-SOL MAX2, ESL4-4CY, v. G_5.0, Dec. 21, 2015.
Standard Test Method for Tensile Properties of Thin Plastic Sheeting_ 10 Pages.
International Search Report for PCT International Application No. PCT/US2016/066309, dated Sep. 26, 2017, 8 pages.
International Search Report for PCT International Application No. PCT/US2016/066348, dated Mar. 31, 2017, 7pgs.
Chen, W., et al., Macromolecules, 2001, vol. 34, pp. 4277-4284.
KSE, "Introduction in properties and applications", Mowital, pp. 01-84.
International Search Report for PCT International Application No. PCT/US2016/066453, dated Sep. 1, 2017, 5 pgs.

\* cited by examiner

ACRYLIC POLYVINYL ACETAL FILMS, COMPOSITION, AND HEAT BONDABLE ARTICLES

CROSS REFERENCE TO RELATED APPLICATIONS

This application is a national stage filing under 35 U.S.C. 371 of PCT/US2015/064219, filed Dec. 7, 2015, which claims the benefit of U.S. Provisional Application No. 62/088,963, filed Dec. 8, 2014, the disclosure of which is incorporated by reference in its/their entirety herein.

SUMMARY

In one embodiment, a film is described. The film comprises a (meth)acrylic polymer and a polyvinyl acetal resin. The polyvinyl acetal resin comprises polymerized units having the formula

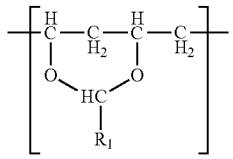

wherein $R_1$ is hydrogen or a C1-C7 alkyl group. The film has a tensile elastic modulus of at least 1 MPa at 25° C. and 1 hertz and a glass transition temperature (i.e. Tg) less than 30° C. The film typically comprises photoinitiator as a result of the method by which the film was made. The film may be a monolithic film or a (e.g. exterior) layer of a multilayer film.

In another embodiment, a method of making a film is described. The method comprises providing a composition comprising polyvinyl acetal resin and free-radically polymerizable solvent monomer. The method comprises applying the composition to a substrate (e.g. release liner or substrate); polymerizing the solvent monomer; and optionally crosslinking the composition thereby forming a film or film layer. The polyvinyl acetal resin and types and amounts of free-radically polymerizable solvent monomer are selected such that the cured composition has a tensile elastic modulus of at least 1 MPa at 25° C. and 1 hertz and a Tg less than 30° C.

In yet another embodiment, a composition is described comprising a (meth)acrylic polymer and a polyvinyl acetal resin. The composition preferably has a tensile elastic modulus of at least 1 MPa at 25° C. and 1 hertz and a Tg less than 30° C.

In some embodiments, the film and/or (e.g. radiation) polymerized and optionally cured composition exhibits a suitable balance of properties such that it can be utilized as a replacement for polyvinyl chloride films or other types of (e.g. flexible) films. In other embodiments, the film and/or (e.g. radiation) cured composition exhibits a suitable balance of properties such that it can be utilized as a heat bondable film.

DETAILED DESCRIPTION

Presently described are films and compositions comprising a (meth)acrylic polymer and polyvinyl acetal resin, as well as methods of making. The composition is preferably prepared by dissolving polyvinyl acetal resin in a free-radically polymerizable solvent monomer. The solvent monomer is preferably polymerized by exposure to (e.g. ultraviolet) radiation.

The "Dahlquist Criterion for Tack" is widely recognized as a necessary condition of a pressure sensitive adhesives (PSA). It states that a PSA has a shear storage modulus (G') of less than $3\times10^6$ dyne/cm$^2$ (0.3 MPa) at approximately room temperature (25° C.) and a frequency of 1 Hertz (Pocius, Adhesion and Adhesive Technology 3$^{rd}$ Ed., 2012, p. 288).

A shear storage modulus can be converted to a tensile storage modulus using the following equation: E'=2G'(r+1), where r is Poisson's ratio for the relevant material. Using this equation and given that Poisson's ratio of elastomers and PSAs is close to 0.5, the Dahlquist Criterion expressed as a tensile storage modulus (E') is less than 0.9 MPa ($9\times10^6$ dyne/cm$^2$).

The film and (e.g. radiation) cured composition described herein generally has a tensile storage modulus (E') at 25° C. of greater than $9\times10^6$ dynes/cm$^2$ (0.9 MPa) at 1 hertz as can be measure by dynamic mechanical analysis (as determined by the test method described in the examples). The tensile storage modulus (E') at 25° C. and 1 Hertz is usually greater than $5\times10^7$ (5 MPa) dynes/cm$^2$, and in some embodiments at least $1\times10^8$ dynes/cm$^2$ (10 MPa), $5\times10^8$ dynes/cm$^2$ (50 MPa). In some embodiments, the tensile storage modulus (E') at 25° C. and 1 Hertz is at least $1\times10^9$ dynes/cm$^2$, $5\times10^9$ dynes/cm$^2$, or $1\times10^{10}$ dynes/cm$^2$ (i.e. 1000 MPa) at 1 Hertz. Thus, the film and composition is not a pressure sensitive adhesive in accordance with the Dahlquist criteria.

The film and composition comprises polymerized units of one or more (meth)acrylate ester monomers derived from a (e.g. non-tertiary) alcohol containing 1 to 14 carbon atoms and preferably an average of 4 to 12 carbon atoms Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like.

The film and composition comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., greater than or equal to −50° C., or greater than or equal to −40° C.

The low Tg monomer may have the formula

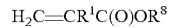

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate (Tg=−70° C.), isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In some embodiments, the film and composition comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth)acrylate, and lauryl (meth)acrylate.

In some embodiments, the monomer is an ester of (meth) acrylic acid with an alcohol derived from a renewable source. A suitable technique for determining whether a material is derived from a renewable resource is through $^{14}C$ analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

One suitable monomer derived from a renewable source is 2-octyl (meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol and 2-methyl butanol. In some embodiments, the film and composition comprises a bio-based content of at least 10, 15, 20, 25, 30, 35, 40, 45, 50, 55 or 60 wt-% using ASTM D6866-10, method B.

In some embodiments, the film and composition typically comprises at least 25 or 30 wt-% of polymerized units of monofunctional alkyl (meth)acrylate monomer having a Tg of less than 0° C., based on the total weight of the polymerized units (i.e. excluding inorganic filler or other additives). In this embodiment, the film and composition typically comprises no greater than 60, 55, 50, 45 or 40 wt-% of polymerized units of monofunctional alkyl (meth)acrylate monomer having a Tg of less than 0° C., based on the total weight of the polymerized units.

In other embodiments, the films and compositions typically comprises at least 35, 40, 45, or 50 wt-% of polymerized units of monofunctional alkyl (meth)acrylate monomer having a Tg of less than 0° C., based on the total weight of the polymerized units (i.e. excluding inorganic filler or other additives). As used herein, wt-% of polymerized units refers to the wt-% based on the total weight of the (meth) acrylic polymer, polyvinyl acetal (e.g. butyral) resin, and crosslinker when present. The heat bondable films and compositions preferably comprise at least 50, 55, 60, 65, 70 or 75 wt-% of polymerized units of monofunctional alkyl (meth)acrylate monomer having a Tg of less than 0° C., based on the total weight of the polymerized units In some embodiments, the film and composition typically comprises no greater than 85 wt-% of polymerized units of monofunctional alkyl (meth)acrylate monomer having a Tg of less than 0° C., based on the total weight of the polymerized units.

When the film or composition is free of unpolymerized components such an inorganic filler and additives, the wt-% of specified polymerized units is approximately the same as the wt-% of such polymerized units present in the total composition. However, when the composition comprises unpolymerized components, such as inorganic filler or other unpolymerizable additive the total composition can comprise substantially less polymerized units. In some embodiments the total amount of unpolymerizable additives may range up to 25 wt-%. Thus, in the case of films and composition comprising such unpolymerizable additives the concentration of specified polymerized units can be as much as 5, 10, 15, 20, 25 wt-% less, depending on the total concentration of such additives. For example, when the film or composition comprises 20 wt-% inorganic filler, the concentration of low Tg monofunctional alkyl (meth)acrylate monomer may be 20% less of the concentration limitations described herein.

In some embodiments, the film and composition generally comprise at least one (e.g. non-polar) high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C.

In some embodiments, the film and composition comprises at least one high Tg monofunctional alkyl (meth) acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate or combinations.

In some embodiments, the film and composition comprises at least 1, 2, or 3 wt-% up to 35 or 40 wt-% of polymerized units of a monofunctional alkyl (meth)acrylate monomer having a Tg greater than 40° C., 50° C., 60° C., 70° C., or 80° C. based on the total weight of the polymerized units (i.e. excluding inorganic filler or other additives). In some embodiments, the film and composition comprises no greater than 30, 25, 20, or 10 wt-% of polymerized units of high Tg monofunctional alkyl (meth) acrylate monomer. In other embodiments, such as heat bondable films, the film and composition may comprise less than 5, 4, 3, 2, 1, 0.5, 0.1 wt-% or is free of polymerized units of high Tg monofunctional alkyl (meth)acrylate monomer.

The Tg of the homopolymer of various monomers is known and is reported in various handbooks. The following table sets forth the Tg of some illustrative monomers as reported (unless specified otherwise) in *Polymer Handbook*, $4^{th}$ edition, edited by J. Brandrup, E. H. Immergut, and E. A. Grulke, associate editors A. Abe and D. R. Bloch, J. Wiley and Sons, New York, 1999.

Glass Transition Temperature (Tg) of the Homopolymer of Monomers

|  | Tg, ° C. |  | Tg, ° C. |
| --- | --- | --- | --- |
| Methyl methacrylate | 105 | Methacrylic acid | 223 |
| Isobutyl methacrylate | 53 | 2-hydroxyethyl acrylate | 4 (b) |
| Hexyl methacrylate | −5 | 2-hydroxyethyl methacrylate | 85 |
| Methyl acrylate | 10 | N-vinyl carbazole | 212 (a) |
| Butyl acrylate | −54 | N,N-dimethyl acrylamide | 89 |

-continued

| | Tg, °C. | | Tg, °C. |
|---|---|---|---|
| 2-octyl acrylate | −45 | N-vinyl pyrrolidone | 54 |
| 2-ethylhexyl acrylate | −50 | N,N-Dimethylamino ethyl acrylate | −39 (a) |
| Isobornyl acrylate | 94 | N,N-Dimethylamino ethyl methacrylate | 19 |
| Acrylic acid | 106 | | |

(a) I. Sideridou-Karayannidou and G. Seretoudi, *Polymer*, Vol. 40, Issue 17, 1999, pp. 4915-4922.
(b) B. Aran, M. Sankir, E. Vargun, N. D. Sankir, and A. Usanmaz; *Journal of Applied Polymer Science*, Wiley Periodicals, Inc., A Wiley Company, 2010, Vol. 116, pp. 628-635

In some embodiments, the film and composition further comprises at least 10, 15 or 20 wt-% and no greater than 65, 60, 55, 50 or 45 wt-% of polymerized units of polar monomers. In other embodiments, such as heat bondable films, the film and composition may comprise lower concentrations of polar monomers, ranging from about 1, 2, 3, 4, or 5 wt-% up to about 15 or 20 wt-% of the polymerized units. Such polar monomers generally aid in compatibilizing the polyvinyl acetal (e.g. butyral) resin with the high and low Tg alkyl (meth)acrylate solvent monomers. The polar monomer typically have a Tg greater than 0° C., yet the Tg may be less than the high Tg monofunctional alkyl (meth) acrylate monomer when high Tg monofunctional alkyl (meth)acrylate monomer is present.

Representative polar monomers include for example acid-functional monomers, hydroxyl functional monomers, nitrogen-containing monomers, and combinations thereof.

In some embodiments, the film and composition comprises polymerized units of an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methyl-propanesulfonic acid, vinylphosphonic acid, and mixtures thereof.

Due to their availability, acid functional monomers are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. In some embodiments, the film and composition comprises 0.5 up to 15, 20 or 25 wt-% of polymerized units of acid functional monomers, such as acrylic acid. In some embodiments, the film and composition comprises at least 1, 2, 3, 4, or 5 wt-% of polymerized units of acid-functional monomers up to about 15 or 20 wt-% of the polymerized units. In other embodiments, the film and composition comprises less than 1.0, 0.5, 0.1 wt-% or is free of polymerized units of acid-functional monomers.

In some embodiments, the film and composition comprises non-acid-functional polar monomer.

One class of non-acid-functional polar monomers includes nitrogen-containing monomers. Representative examples include N-vinylpyrrolidone; N-vinylcaprolactam; acrylamide; mono- or di-N-alkyl substituted acrylamide; t-butyl acrylamide; dimethylaminoethyl acrylamide; and N-octyl acrylamide. In some embodiments, the film and composition comprises at least 0.5, 1, 2, 3, 4, or 5 wt-% of polymerized units of nitrogen-containing monomers and typically no greater than 25 or 30 wt-%. In other embodiments, the film and composition comprises less than 1.0, 0.5, 0.1 wt-% or is free of polymerized units of nitrogen-containing monomers.

Another class of non-acid-functional polar monomers includes alkoxy-functional (meth)acrylate monomers. Representative examples 2-(2-ethoxyethoxy)ethyl (meth)acrylate, 2-ethoxyethyl (meth)acrylate, 2-hydroxyethyl (meth)acrylate, 2-(methoxyethoxy)ethyl (meth)acrylate, 2-methoxyethyl methacrylate, and polyethylene glycol mono(meth)acrylates.

In some embodiments, the film and composition comprises at least 0.5, 1, 2, 3, 4, or 5 wt-% of polymerized units of alkoxy-functional (meth)acrylate monomers and typically no greater than 30 or 35 wt-%. In other embodiments, the film and composition comprises less than 1.0, 0.5, 0.1 wt-% or is free of polymerized units of alkoxy-functional (meth) acrylate monomers.

Preferred polar monomers can include acrylic acid, 2-hydroxyethyl (meth)acrylate; N,N-dimethyl acrylamide and N-vinylpyrrolidinone. In some embodiments, the film and composition comprises polymerized units of polar monomer in an amount of at least 10, 15 or 20 wt-% and typically no greater than 65, 60, 55, 50 or 45 wt-%.

The film and composition may optionally comprise vinyl monomers including vinyl esters (e.g., vinyl acetate and vinyl propionate), styrene, substituted styrene (e.g., α-methyl styrene), vinyl halide, and mixtures thereof. As used herein vinyl monomers are exclusive of polar monomers. In some embodiments, the film and composition comprises at least 0.5, 1, 2, 3, 4, or 5 wt-% and typically no greater than 10 wt-% of polymerized units of vinyl monomers. In other embodiments, the film and composition comprises less than 1.0, 0.5, 0.1 wt-% or is free of polymerized units of vinyl monomers.

In some favored embodiments, the polymerized units of the (meth)acrylic polymer contain aliphatic groups and lack aromatic moieties.

In typical embodiments, the solvents monomer(s) are polymerized to form a random (meth)acrylic polymer copolymer.

The polyvinyl acetal resin utilized in the present invention is obtained, for example, by reacting polyvinyl alcohol with aldehyde, as known in the art.

Polyvinyl alcohol resins are not limited by the production method. For example, those produced by saponifying polyvinyl acetate and the like with alkali, acid, ammonia water, and the like, can be used. Polyvinyl alcohol resins may be either completely saponified or partially saponified. It is preferable to use those having a saponification degree of 80 mol % or more.

The polyvinyl alcohol resins may be used singly or in combination of two or more.

Aldehydes used in the production of the polyvinyl acetal resin include formaldehyde (including paraformaldehyde), acetaldehyde (including paraacetaldehyde), propionaldehyde, butyraldehyde, n-octylaldehyde, amylaldehyde, hexylaldehyde, heptylaldehyde, 2-ethylhexylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, ß-phenylpropionaldehyde, and the like. These aldehydes may be used singly or in combination of two or more.

The polyvinyl acetal resin generally has repeating units represented by Chemical Formula 1.

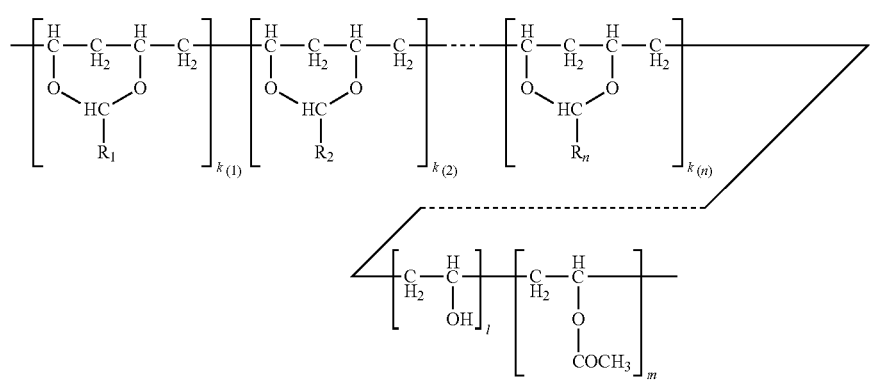

[Chemical Formula 1]

In Chemical Formula 1, n is the number of different types of aldehyde used in acetalization; $R_1$, $R_2$, ..., $R_n$, are independently a (e.g. C1-C7) alkyl residue of aldehyde used in the acetalization reaction, or a hydrogen atom; $k_1$, $k_2$, ..., $k_n$ are independently the proportion of each acetal unit containing $R_1$, $R_2$, ..., $R_n$, (molar ratio); l is the proportion of vinyl alcohol units (molar ratio); and m is the proportion of vinyl acetate units (molar ratio). The sum of $k_1+k_2+ ... +k_n+l+m=1$. Further at least one of $k_1$, $k_2$, ..., $k_n$ may not be zero. When a single type of aldehyde is utilized in the preparation of the polyvinyl acetal resin, such single aldehyde may be represented by $k_1$. The number of repeat units of $k_1+l+m$ is sufficient to provide the desired molecular weight. In this embodiment, $k_2$ and $k_n$ may be zero. The polyacetal resin is typically a random copolymer. However, block copolymers and tapered block copolymers may provide similar benefits as random copolymers.

The content of polyvinyl acetyl (e.g. butyral) typically ranges from 65 wt-% up to 90 wt-% of the polyvinyl acetal (e.g. butyral) resin. In some embodiments, the content of polyvinyl acetyl (e.g. butyral) ranges from about 70 or 75 up to 80 or 85 wt-%. Thus, the number of repeat units of "$k_1$, $k_2$, ..., $k_n$" are selected accordingly.

The content of polyvinyl alcohol typically ranges from about 10 to 30 wt-% of the polyvinyl acetal (e.g. butyral) resin. In some embodiments, the content of polyvinyl alcohol ranges from about 15 to 25 wt-%. Thus, "l" is selected accordingly.

The content of polyvinyl acetate can be zero or range from 1 to 8 wt-% of the polyvinyl acetal (e.g. butyral) resin. In some embodiments, the content of polyvinyl acetate ranges from about 1 to 5 wt-%. Thus, "m" is selected accordingly.

In some embodiments, the alkyl residue of aldehyde comprises 1 to 7 carbon atoms. In other embodiments, the alkyl reside of the aldhehyde comprises 3 to 7 carbon atoms such as in the case of butylaldehyde ($R_1$=3), hexylaldehyde ($R_1$=5), n-octylaldehyde ($R_1$=7). Of these butyraldehyde, also known as butanal is most commonly utilized. Polyvinyl butyral ("PVB") resin is commercially available from Kuraray under the trade designation Mowital™ and Solutia under the trade designation "Butvar™".

In some embodiments, the polyvinyl acetal (e.g. butyral) resin has a Tg ranging from about 60° C. up to about 75° C. or 80° C. In some embodiments, the Tg of the polyvinyl acetal (e.g. butyral) resin is at least 65 or 70° C. When other aldehydes, such as n-octyl aldehyde, are used in the preparation of the polyvinyl acetal resin, the Tg may be less than 65° C. or 60° C. The Tg of the polyvinyl acetal resin is typically at least 35, 40 or 45° C. When the polyvinyl acetal resin has a Tg of less than 60° C., higher concentrations of high Tg monomers may be employed in the film and (e.g. exemplified) composition in comparison to those utilizing polyvinyl butyral resin. When other aldehydes, such as acetaldehyde, are used in the preparation of the polyvinyl acetal resin, the Tg may be greater than 75° C. or 80° C. When the polyvinyl acetal resin has a Tg of greater than 70° C., higher concentrations of low Tg monomers may be employed in the film and (e.g. exemplified) composition in comparison to those utilizing polyvinyl acetal butyral resin.

The polyvinyl acetal (e.g. PVB) resin typically has an average molecular weight (Mw) of at least 10,000 g/mole or 15,000 g/mole and no greater than 150,000 g/mole or 100,000 g/mole. In some favored embodiments, the polyacetal (e.g. PVB) resin has an average molecular weight (Mw) of at least 20,000 g/mole; 25,000; 30,000, 35,000 g/mole and typically no greater than 75,000 g/mole.

The film and composition comprises 5 to 30 wt-% of polyvinyl acetal resin such as polyvinyl butyral based on the total weight of the polymerized units of the (meth)acrylate polymer, polyvinyl acetal (e.g. butyral) resin, and crosslinker when present. In some embodiments, the film and composition comprises at least 10, 11, 12, 13, 14, or 15 wt-% of polyvinyl acetal (e.g. PVB) resin. In some embodiments, the film and composition comprises no greater than 25 or 20 wt-% of (e.g. prepolymerized) polyvinyl acetal (e.g. PVB) resin. When the film and composition comprises a polyvinyl acetal (e.g. PVB) resin having an average molecular weight (Mw) less than 50,000 g/mole, the film and composition may comprise higher concentration polyvinyl acetal (e.g. PVB) resin such as 35 or 40 wt-%.

The heat bondable film and composition may comprise a lower amount of polyvinyl acetal resin such as polyvinyl butyral. In some embodiments, the heat bondable film and composition comprises at least 5, 6, 7, 8, 9, or 10 wt-% of polyvinyl acetal resin. In some embodiments, the heat bonable film and composition comprises no greater than 20, 19, 18, 17, 16, or 15 wt-% of polyvinyl acetal resin. When the film and composition comprises a polyacetal (e.g. PVB) resin having an average molecular weight (Mw) less than 50,000 g/mole, the film and composition may comprise higher concentration polyvinyl (e.g. PVB) acetal resin such as 25 or 30 wt-%.

In some embodiments, the film and composition comprises a crosslinker. In some embodiments, the crosslinker is a multifunctional crosslinker capable of crosslinking polymerized units of the (meth)acrylic polymer such as in the case of crosslinkers comprising functional groups selected from (meth)acrylate, vinyl, and alkenyl (e.g. C3-C20 olefin groups); as well as chlorinated triazine crosslinking compounds.

Examples of useful (e.g. aliphatic) multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof.

In one embodiment, the crosslinking monomer comprises a (meth)acrylate group and an olefin group. The olefin group comprises at least one hydrocarbon unsaturation The crosslinking monomer may have the formula

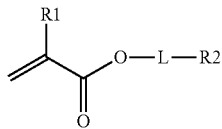

$R_1$ is H or $CH_3$,
L is an optional linking group; and
$R_2$ is an olefin group, the olefin group being optionally substituted.

Dihydrocyclopentadienyl acrylate is one example of this class of crosslinking monomer. Other crosslinking monomers of this type comprising a $C_6$-$C_{20}$ olefin are described in WO2014/172185.

In other embodiments, the crosslinking monomer comprises at least two terminal groups selected from allyl, methallyl, or combinations thereof. An allyl group has the structural formula $H_2C{=}CH{-}CH_2{-}$. It consists of a methylene bridge ($-CH_2-$) attached to a vinyl group ($-CH{=}CH_2$). Similarly, a methallyl group is a substituent with the structural formula $H_2C{=}C(CH_3){-}CH_2{-}$. The terminology (meth)allyl includes both allyl and methallyl groups. Crosslinking monomers of this types are described in PCT Publication No. WO2015/157350.

In some embodiments, the film and composition may comprise a multifunctional crosslinker comprising vinyl groups, such as in the case of 1,3-divinyl tetramethyl disiloxane.

The triazine crosslinking compound may have the formula.

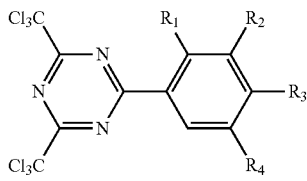

wherein $R_1$, $R_2$, $R_3$ and $R_4$ of this triazine crosslinking agent are independently hydrogen or alkoxy group, and 1 to 3 of $R_1$, $R_2$, $R_3$ and $R_4$ are hydrogen. The alkoxy groups typically have no greater than 12 carbon atoms. In favored embodiments, the alkoxy groups are independently methoxy or ethoxy. One representative species is 2,4,-bis(trichloromethyl)-6-(3,4-bis(methoxy)phenyl)-triazine. Such triazine crosslinking compounds are further described in U.S. Pat. No. 4,330,590.

In other embodiments, the crosslinker comprises hydroxyl-reactive groups, such as isocyanate groups, capable of crosslinking alkoxy group of the (meth)acrylic polymer (e.g. HEA) or polyvinyl alcohol groups of the polyvinyl acetal (PVB). Examples of useful (e.g. aliphatic) multifunctional isocyanate crosslinkers include hexamethylene diisocyanate, isophorone diisocyanate, as well as derivatives and prepolymers thereof.

Various combinations of two or more of crosslinkers may be employed.

When present, the crosslinker is typically present in an amount of at least 0.5, 1.0, 1.5, or 2 wt-% ranging up to 5 or 10 wt-% based on the total weight of the polymerized units of the (meth)acrylate polymer, polyvinyl acetal (e.g. butyral) resin, and crosslinker. The heat bondable film and composition may comprise even lower concentrations of crosslinker, typically ranging from at least 0.05, 0.1, 0.2 0.3, 0.4 or 0.5 wt-% ranging up to 2, 3, 4, or 5 wt-%. Thus the film and composition comprise such amount of polymerized crosslinker units.

The composition can be polymerized by various techniques, yet is preferably polymerized by solventless radiation polymerization, including processes using electron beam, gamma, and especially ultraviolet light radiation. In this (e.g. ultraviolet light radiation embodiment, generally little or no methacrylate monomers are utilized. Thus, the film and composition comprises zero or no greater than 10, 9, 8, 7, 6, 5, 4, 3, 2, or 1 wt-% of polymerized units of monomer having a methacrylate group.

One method of preparing the film and composition described herein comprises dissolving the polyvinyl acetal (e.g. PVB) polymer in the unpolymerized solvent monomer(s) of the (meth)acrylic polymer forming a coatable composition of sufficient viscosity.

Another method includes partially polymerizing the solvent monomer(s) to produce a syrup composition comprising the solute (meth)acrylic polymer and unpolymerized solvent monomer(s). The unpolymerized solvent monomer(s) typically comprises the same monomer as utilized to produce the solute (meth)acrylic polymer. If some of the monomers were consumed during the polymerization of the (meth)acrylic polymer, the unpolymerized solvent monomer(s) comprises at least some of the same monomer(s) as utilized to produce the solute (meth)acrylic polymer. Further, the same monomer(s) or other monomer(s) can be added to the syrup once the (meth)acrylic polymer has been formed. Partial polymerization provides a coatable solution of the (meth)acrylic solute polymer in one or more free-radically polymerizable solvent monomers.

A preferred method of preparation of the syrup composition is photoinitiated free radical polymerization.

The polyvinyl acetal (e.g. PVB) polymer can be added prior to and/or after partial polymerization of monomer(s) of the (meth)acrylic polymer. In this embodiment, the coating composition comprises partially polymerized (e.g. alkyl (meth)acrylate) solvent monomers and polyvinyl acetal (e.g. PVB) polymer resin. The coatable composition is then coated on a suitable substrate and further polymerized.

The viscosity of the coatable composition is typically at least 1,000 or 2,000 cps ranging up to 100,000 cps at 25° C. In some embodiments, the viscosity is no greater than 75,000; 50,000, or 25,000 cps. The coatable composition is coated on a suitable substrate. such as a release liner, and polymerized by exposure to radiation.

The method can form a higher molecular weight (meth) acrylic polymer than can be used by solvent blending a prepolymerized (meth)acrylic polymer and polyvinyl acetal (e.g. PVB) polymer. Higher molecular weight (meth)acrylic polymer can increase the amount of chain entanglements, thus increasing cohesive strength. Also, the distance between crosslinks can be greater with a high molecular (meth)acrylic polymer, which allows for increased wet-out onto a surface of an adjacent (e.g. film) layer.

The molecular weight of the composition can be increased even further by the inclusion of crosslinker.

In some embodiments, the high molecular weight (meth) acrylic polymer as well as the composition and film typically has a gel content (as measured according to the Gel Content Test Method described in the examples utilizing tetrahydrofuran (THF) of at least 20, 25 30, 35, or 40%. In some embodiments, the gel content is at least 45, 50, 55, 60, 65, 70, 75, 80, 85, 90, or 95%. The gel content is typically less than 100%, 99%, or 98%.

The polymerization is preferably conducted in the absence of unpolymerizable organic solvents such as ethyl acetate, toluene and tetrahydrofuran, which are non-reactive with the functional groups of the solvent monomer and polyvinyl (e.g. PVB) acetal. Solvents influence the rate of incorporation of different monomers in the polymer chain and generally lead to lower molecular weights as the polymers gel or precipitate from solution. Thus, the film and compositions can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the polymer has been formed, i.e., photoinitiator can be added to the composition. Such polymerizable photoinitiators are described, for example, in U.S. Pat. Nos. 5,902,836 and 5,506,279 (Gaddam et al.).

Such photoinitiators are typically present in an amount of from 0.1 to 1.0 wt-%. Relatively thick coatings can be achieved when the extinction coefficient of the photoinitiator is low.

The composition and the photoinitiator may be irradiated with activating UV radiation to polymerize the monomer component(s). UV light sources can be of various typesincluding relatively low light intensity sources such as blacklights, which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and relatively high light intensity sources such as medium pressure mercury lamps which provide intensities generally greater than 10 mW/cm$^2$, preferably 15 to 450 mW/cm$^2$. Intensities can range from 0.1 to 150 mW/cm$^2$, preferably from 0.5 to 100 mW/cm$^2$, and more preferably from 0.5 to 50 mW/cm$^2$. The monomer component(s) can also be polymerized with high intensity light sources as available from Fusion UV Systems Inc. UV light to polymerize the monomer component(s) can be provided by light emitting diodes, blacklights, medium pressure mercury lamps, etc. or a combination thereof.

The composition and film may optionally contain one or more conventional additives. Additives include, for example, antioxidants, stabilizers, ultraviolet absorbers, lubricants, processing aids, antistatic agents, colorants, impact resistance aids, fillers, matting agents, flame retardents (e.g. zinc borate) and the like. In some embodiments, the amount of additive can be at least 0.1, 0.2, 0.3, 0.4, or 0.5 wt-% and it typically no greater than 25, 20, 15, 10 or 5 wt-% of the total composition and film.

In some embodiments, the compositions are free of plasticizer, tackifier and combinations thereof. In other embodiments, the film and composition comprise plasticizer, tackifier and combinations thereof in amount no greater than 5, 4, 3, 2, or 1 wt-% of the total composition. From the standpoint of tensile strength, it is preferable not to add a large amount of tackifier or plasticizer.

In some embodiments, the composition comprises fumed silica. Fumed silica, also known as pyrogenic silica, is made from flame pyrolysis of silicon tetrachloride or from quartz sand vaporized in a 3000° C. electric arc. Fumed silica consists of microscopic droplets of amorphous silica fused into (e.g. branched) three-dimensional primary particles that aggregate into larger particles. Since the aggregates do not typically break down, the average particle size of fumed silica is the average particle size of the aggregates. Fumed silica is commercially available from various global producers including Evonik, under the trade designation "Aerosil"; Cabot under the trade designation "Cab-O-Sil", and Wacker Chemie-Dow Corning. The BET surface area of suitable fumed silica is typically at least 50 m$^2$/g, or 75 m$^2$/g, or 100 m$^2$/g. In some embodiments, the BET surface area of the fumed silica is no greater than 400 m$^2$/g, or 350 m$^2$/g, or 300 m$^2$/g, or 275 m$^2$/g, or 250 m$^2$/g. The fumed silica aggregates preferably comprise silica having a primary particle size no greater than 20 nm or 15 nm. The aggregate particle size is substantially larger than the primary particle size and is typically at least 100 nm or greater.

The concentration of (e.g. fumed) silica can vary. In some embodiments, the composition comprises at least 0.5 or 1.0 wt-% of (e.g. fumed) silica.

In some embodiments, the film and composition comprise colorants such as pigments and dyes such as titania and carbon black. The concentration of such pigments and dyes can range up to about 20 wt-% of the total composition.

The inclusion of inorganic oxides such as (e.g. fumed) silica and titania can increase the tensile strength of the film and composition.

The compositions can be coated on a (e.g. polyester or polycarbonate) backing or release liner using conventional coating techniques. For example, these compositions can be applied by methods such as roller coating, flow coating, dip coating, spin coating, spray coating knife coating, and die coating. Coating thicknesses may vary. The composition may be of any desirable concentration for subsequent coating, but is typically 5 to 2030, 35 or 40 wt-% polyvinyl acetal polymer solids in (meth)acrylic solvent monomer. The desired concentration may be achieved by further dilution of the coating composition, or by partial drying. The coating thickness may vary depending on the desired thickness of the (e.g. radiation) cured film.

When the film is a monolithic film, the thickness of the (e.g. radiation) cured film is typically at least 10, 15, 20, or 25 microns (1 mil) to 500 microns (20 mils) thickness. In some embodiments, the thickness of the (e.g. radiation) cured film is no greater than 400, 300, 200, or 100 microns. When the film is a film layer of a multilayer film, the multilayer film typically has the thickness just described. However, the thickness of the film layer comprising the (meth)acrylic polymer and polyvinyl acetal, as described herein, may be less than 10 microns.

In some embodiments, the thickness of the film may range up to 50, 100, or 150 mils. The (e.g. radiation) cured film may be in the form of individual sheets, particularly for a thickness of greater than 20 mils. The (e.g. thinner) cured film may be in the form of a roll-good.

The composition of the present invention may be coated upon a variety of flexible and inflexible backing materials using conventional coating techniques to produce heat bondable films disposable on a backing, or in otherwords a single coated or double coated heat bondable tape. Suitable backing materials include but are not limited to polymeric films, woven or nonwoven fabrics; metal foils, foams, and combinations thereof (e.g. metalized polymeric film). Polymeric films include for example polyolefins such as polypropylene (e.g. biaxially oriented), polyethylene (e.g. high density or low density), polyvinyl chloride, polyester (polyethylene terephthalate), polycarbonate, polymethyl(meth)acrylate (PMMA), polyvinylbutyral, polyimide, polyamide, fluoropolymer, cellulose acetate, cellulose triacetate, and ethyl cellulose. In one embodiment, the backing material is a film comprising a (meth)acrylic monomer and a polyvinyl acetal (e.g. PVB) resin wherein the film has a Tg of at least 30° C. typically ranging to 60° C., as described in U.S. Application No. 62/088,945, filed Dec. 8, 2014, and 75577WO003 PCT Application filed on even date herewith; incorporated herein by reference.

The woven or nonwoven fabric may comprise fibers or filaments of synthetic or natural materials such as cellulose (e.g. tissue), cotton, nylon, rayon, glass, ceramic materials, and the like. In some embodiments, the substrate may be comprised of a bio-based material such as polylactic acid (PLA).

For those heat bondable tapes having sufficient adhesion (e.g. room temperature 180° peel values without heat bonding) such that contaminants may accumulate on the surface of the tape and to protect the surface of the tape prior to use the tape may further comprise a release material or release liner in the same manner as single-sided and double-sided pressure sensitive adhesive tapes. For example, in the case of a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed.

The substrate that is bonded by the heat bondable film may comprise the same materials as those of the backing.

The film and (e.g. radiation) cured composition can be characterized using various techniques. Although the Tg of a copolymer may be estimated by use of the Fox equation, based on the Tgs of the constituent monomers and the weight percent thereof, the Fox equation does not take into effect interactions, such as incompatibility, that can cause the Tg to deviate from the calculated Tg. The Tg of the film and composition described refers to the midpoint Tg as measured by Differential Scanning calorimetry, (DSC), according to the test method described in the examples. The Tg of the film and (e.g. radiation) cured composition is less than 30° C., and in some embodiments less than 25 or 20° C. In some embodiments, the film and (e.g. radiation) cured composition preferably exhibits a single Tg as measured by DSC. In some embodiments, the Tg of the film and (e.g. radiation) cured composition is at least 0, 5, 10, 15, 20 or 25° C. In other embodiments, the Tg of the heat bondable film and (e.g. radiation) cured composition is typically less than 0, −5 or −10° C. and typically at least −50° C. or −40° C. as measured by DSC. The midpoint Tg as measured by DSC of the film and (e.g. radiation) cured compositions described herein is 10-12° C. lower than the peak temperature Tg as measured by Dynamic Mechanical Analysis (DMA) at a frequency of 10 Hz and a rate of 3° C./min.

In some embodiments, the film and (e.g. radiation) cured composition can be characterized by tensile and elongation according to the test method described in the examples. In favored embodiments, the tensile strength is at least 10, 11, 12, 13, 14 or 15 MPa and typically no greater than 50, 45, 40, or 35 MPa. The elongation at break can range from 2, 3, 4 or 5% up to about 150%, 200%, or 300% and greater. In some favored embodiments, the elongation is at least 50, 100, or 150%. In some embodiments, the film is suitable for use as a replacement for polyvinyl chloride film.

In some embodiments, the film and (e.g. radiation) cured compositions are preferably non-tacky to the touch at room temperature (25° C.) and preferably at (e.g. storage or shipping) temperatures ranging up to (120° F.) 50° C.

In some embodiments, the films may exhibit a low level of adhesion to glass or stainless steel. For example, the 180° peel values can be about 0.5, 1 or 2 N/dm or less at a 12 inch/minute peel rate. In other embodiments, the 180° peel values of the heat bondable films and composition can be higher, for example at least 3, 4, 5, 6, 7, 8, 9, or 10 N/dm and typically no greater than about 20 N/dm.

In some embodiments, the film and composition is suitable for use as a heat bondable film or heat bondable film layer disposed on a substrate. Heat bondable films can generally form a bond at a temperature ranging from about 50, 60 or 70° C. ranging up to about 140, 145, or 150° C. In some embodiments, the heat bonding is accomplished utilizing a pressure of about 5 to 20 psi for a duration of time of about 5, 10, 15, 20, 25, or 30 seconds.

The heat bondable film is suitable for bonding various metal (e.g. stainless steel) and polymeric (e.g. polycarbonate) substrates (such as in the manner described in the test method of the examples). In one embodiment, the film is heat bondable to stainless steel at a temperature of 149° C. and exhibits a peel strength of at least 15 or 20 N/dm ranging up to 50, 75, 100, 125, or 150 N/dm at 25° C. after heat bonding. In another embodiment, the film is heat bondable to polycarbonate at a temperature of 120° C. and exhibits a peel strength of at least 0.5, 0.6, 0.7, or 0.8 kg/cm ranging up to 2, 2.5, or 3 kg/cm at 25° C. after heat bonding. In another embodiment, the film is heat bondable to polycarbonate at a temperature of 120° C. and exhibits a peel strength of at least 1, 1.5, or 2 kg/cm ranging up to 3, 3.5, 4.0, 4.5 or 5 kg/cm at 70° C. after heat bonding.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

The term heteroalkyl refers to an alkyl group, as just defined, having at least one catenary carbon atom (i.e. in-chain) replaced by a catenary heteroatom such as O, S, or N.

"Renewable resource" refers to a natural resource that can be replenished within a 100 year time frame. The resource may be replenished naturally or via agricultural techniques. The renewable resource is typically a plant (i.e. any of various photosynthetic organisms that includes all land plants, inclusive of trees), organisms of Protista such as seaweed and algae, animals, and fish. They may be naturally occurring, hybrids, or genetically engineered organisms. Natural resources such as crude oil, coal, and peat which take longer than 100 years to form are not considered to be renewable resources.

When a group is present more than once in a formula described herein, each group is "independently" selected unless specified otherwise.

The invention includes but is not limited to the following embodiments.

Embodiment 1 is a film comprising:
(meth)acrylic polymer and polyvinyl acetal resin comprising polymerized units having the following formula

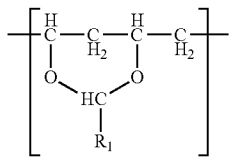

wherein $R_1$ is hydrogen or a C1-C7 alkyl group;
wherein the film has a tensile elastic modulus of at least 1 MPa at 25 C and 1 hertz and a Tg less than 30° C.

Embodiment 2 is the film Embodiment 1 wherein the film comprises at least 25, 30, 35, 40, 50 wt-% of polymerized units of monofunctional alkyl (meth)acrylate monomer having a Tg of less than 0° C.

Embodiment 3 is the film of Embodiment 2 wherein the film comprises no greater than 85 wt-% of polymerized units of monofunctional alkyl (meth)acrylate monomer having a Tg of less than 0° C.

Embodiment 4 is the film of Embodiments 2 or 3 wherein the monofunctional alkyl (meth)acrylate monomer has a Tg of less than −10° C., −20° C., −30° C., −40° C., or −50° C.

Embodiment 5 is the film of Embodiments 1-4 wherein the film comprises a bio-based content of at least 25 or 50% of the total carbon content.

Embodiment 6 is the film of Embodiments 1-5 wherein the film comprises polymerized units of an alkyl (meth)acrylate monomer having an alkyl group with 8 carbon atoms.

Embodiment 7 is the film of Embodiments 1-6 wherein the film further comprises up to 20 wt-% of polymerized units of a monofunctional alkyl (meth)acrylate monomer having a Tg greater than 40° C., 50° C., 60° C., 70° C., or 80° C.

Embodiment 8 is the film of Embodiments 1-7 wherein the film further comprises at least 5, 10, 15 or 20 wt-% and no greater than 65 wt-% of polymerized units of polar monomers.

Embodiment 9 is the film of Embodiment 8 wherein polar monomers are selected from acid-functional, hydroxyl functional monomers, nitrogen-containing monomers, and combinations thereof.

Embodiment 10 is the film of Embodiments 1-9 wherein the film comprises polyvinyl butyral.

Embodiment 11 is the film of Embodiments 1-10 wherein the film comprises 5 to 20 wt-% of polyvinyl acetal resin.

Embodiment 12 is the film of Embodiments 1-11 wherein the polyvinyl acetal resin has a polyvinyl alcohol content ranging from 10 to 30 wt-%.

Embodiment 13 is the film of Embodiments 1-12 wherein the polyvinyl acetal resin has a glass transition temperature ranging from 60° C. to 75° C.

Embodiment 14 is the film of Embodiments 1-13 wherein the polyacetal resin has an average molecular weight (Mw) ranging from 10,000 g/mole to 100,000 g/mole.

Embodiment 15 is the film of Embodiments 1-14 wherein the film further comprises polymerized units of a multifunctional crosslinker wherein the crosslinker is a traizine crosslinker or comprises functional groups selected from (meth)acrylate, alkenyl, and hydroxyl-reactive groups.

Embodiment 16 is the film of Embodiments 1-15 wherein the film further comprises additives in an amount no greater than 25 wt-%.

Embodiment 17 is the film Embodiments 1-16 wherein the film comprises photoinitiator.

Embodiment 18 is the film composition of Embodiments 1-17 wherein the film comprises no greater than 10 wt-% of polymerized units of methacrylate monomers.

Embodiment 19 is the film composition of Embodiments 1-18 wherein the (meth)acrylic polymer is a random copolymer.

Embodiment 20 is the film of Embodiments 1-19 wherein the film is a monolithic film.

Embodiment 21 is the film of Embodiments 1-19 wherein the film is a film layer of a multilayer film.

Embodiment 22 is a method of making a film comprising:
a) providing a composition comprising
i) polyvinyl acetal resin comprising polymerized units having the following formula

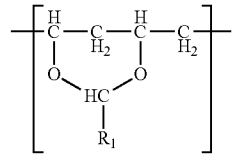

wherein $R_1$ is hydrogen or a C1-C7 alkyl group; and
ii) free-radically polymerizable solvent monomer;
b) applying the composition to a substrate; and
c) polymerizing and optionally crosslinking the composition thereby forming a film having a tensile elastic modulus of at least 1 MPa at 25 C and 1 hertz and a Tg less than 30° C.

Embodiment 23 is the method of Embodiment 22 wherein the substrate is a release liner.

Embodiment 24 is the method of Embodiments 22-23 wherein the crosslinking comprises free-radical polymerization.

Embodiment 25 is the method of Embodiment 24 wherein the crosslinking comprise curing by exposure to ultraviolet radiation.

Embodiment 26 is the method of Embodiments 22-25 further characterized by any one or combination of Embodiments 2-21.

Embodiment 27 is a composition comprising (meth) acrylic polymer and polyvinyl acetal resin comprising polymerized units having the following formula

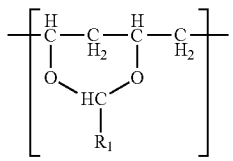

wherein $R_1$ is hydrogen or a C1-C7 alkyl group;
wherein the composition has a tensile elastic modulus of at least 1 MPa at 25 C and 1 hertz and a Tg less than 30° C.

Embodiment 28 is the composition of Embodiment 27 further characterized by any one or combination of Embodiments 2-19.

Embodiment 29 is the multilayer film of Embodiment 21 disposed on at least one major surface of a backing.

Embodiment 30 is the multilayer film of Embodiment 21 comprising the film of claims 1-19 disposed on both major surfaces of a backing.

Embodiment 31 is the film of Embodiments 1-21, 29, 30 wherein the film comprises at least 55, 60, 65, 70, or 76 wt-% of polymerized units of monofunctional alkyl (meth) acrylate monomer having a Tg of less than 0° C.

Embodiment 32 is the film of Embodiments 1-19 and 29-31 wherein the film is heat bondable to stainless steel at a temperature of 149° C. and exhibits a peel strength of at least 20 N/dm at 25° C. after heat bonding.

Embodiment 33 is the film of Embodiments 1-19 and 29-31 wherein the film is heat bondable to polycarbonate at a temperature of 100° C. and exhibits a peel strength of at least 1 pound/inch at 25° C. after heat bonding.

Embodiment 34 is a method of bonding comprising providing a film according to any of the previous embodiments; contacting the film with a least one substrate; and bonding the substrate by means of heat and pressure with the film.

Objects and advantages of this invention are further illustrated by the following examples. The particular materials and amounts, as well as other conditions and details, recited in these examples should not be used to unduly limit this invention.

EXAMPLES

TABLE 1

| Glossary of Materials | | |
|---|---|---|
| Designation | Description | Source |
| B60HH | Polyvinyl butyral, ~60,000 g/mol, available under the trade designation "MOWITAL B 60 HH" | Kurarary America, Inc. (Houston, TX, USA) |
| B30HH | Polyvinyl butyral, ~30,000 g/mol, available under the trade designation "MOWITAL B 30 HH" | Kurarary America, Inc. (Houston, TX, USA) |
| B60H | Polyvinyl butyral, ~60,000 g/mol, available under the trade designation "MOWITAL B 60 H" | Kurarary America, Inc. (Houston, TX, USA) |
| CAP | Cellulose acetate propionate, available under the trade designation "CAP-482-20" | Eastman Chemical Company (Kingsport, TN, USA) |
| PVAc | Polyvinyl acetate, ~40,000 g/mol | Alfa Aesar (Ward Hill, MA, USA) |
| PVP | Polyvinyl pyrrolidone, ~50,000 g/mol | Alfa Aesar (Ward Hill, MA, USA) |
| PCL | Polycaprolactone resin, ~50,000 g/mol, available under the trade designation "CAPA 6500" | Perstorp Holding AB (Perstorp, Sweden) |
| Low Tg Monomer IOA (Tg = −70° C.) | Iso-octyl acrylate | 3M Company (St. Paul, MN, USA) |
| Low Tg Monomer 2OA (Tg = −45° C.) | 2-Octyl acrylate | Prepared according to Preparatory Example 1 of U.S. Pat. No. 7,385,020 |
| Low Tg Monomer EHA (Tg = −50° C.) | 2-Ethylhexyl acrylate | BASF Corporation (Florham Park, NJ, USA) |
| Polar Monomer HEA (Tg = 4° C.) | 2-Hydroxyethyl acrylate | Kowa American Corporation (New York, NY, USA) |
| Polar Monomer HBA (Tg = −40° C.) | 4-Hydroxybutyl acrylate | BASF Corporation (Florham Park, NJ, USA) |
| High Tg Monomer IBOA (Tg = 94° C.) | Isobornyl acrylate | San Ester Corporation (New York, NY, USA) |
| High Tg Polar Monomer AA (Tg = 106° C.) | Acrylic acid | BASF Corporation (Florham Park, NJ, USA) |

TABLE 1-continued

Glossary of Materials

| Designation | Description | Source |
|---|---|---|
| High Tg Polar Monomer NVP (Tg = 54° C.) | N-vinylpyrrolidone | TCI America, Montgomeryville, PA |
| High Tg Polar Monomer NNDMA (Tg = 89° C.) | N,N-dimethylacrylamide | Sigma-Aldrich Company (St. Louis, MO, USA) |
| CD 9055 (Tg = <30° C.) | acid acrylate available under the trade designation "CD 9055" | Sartomer, Exton, PA, |
| IRGACURE 651 | An initiator avalailable under the trade designation "IRGACURE 651" | BASF Corporation (Florham Park, NJ, USA) |
| CN965 Crosslinker | A urethane acrylate available under the trade designation "CN965 Urethane Acrylate" | Sartomer America (Exton, PA, USA) |
| DPA Crosslinker | Dihydrocyclopenadienyl acrylate | BASF Corporation (Florham Park, NJ, USA) |
| HDDA Crosslinker | 1,6-hexanediol diacrylate | Cytec Industries, Inc. (Woodland Park, NJ, USA) |
| T1 Crosslinker | 2,4-bis-Trichloromethyl-6-(4-methoxy-phenyl)-1,3,5-triazine | Can be prepared according to Wakabayashi et al., Bull. Chem. Soc. Jap, Vol. 42, pages 2924-2930 (1969) |
| D12A Crosslinker | Linear aromatic urethane blocked isocyanate with ether groups, available under the trade designation "DESMOCAP 12A" | Bayer Material Science, LLC (Pittsburgh, PA, USA) |
| D11A Crosslinker | Branched aromatic urethane blocked isocyante with ether groups, available under the trade designation "DESMOCAP 11A" | Bayer Material Science, LLC (Pittsburgh, PA, USA) |
| TMPDE Crosslinker | Trimethylolpropane diallyl ether, available under the trade designation "TMPDE 90" | Perstorp Holding AB (Perstorp, Sweden) |
| DVTD Crosslinker | 1,3-Divinyl tetramethyl disiloxane), available under the trade designation "SID4613.0" | Gelest, Inc. (Morristown, PA, USA) |
| CN963B80 Crosslinker | An aliphatic polyester based urethane diacrylate oligomer blended with 20% SR238, hexane diol diacrylate available under the trade designation "CN 963 B80" | Sartomer, Exton, PA |
| DESMODUR ™ N3800 | Aliphatic polyisocyanate available under the trade designation "DESMODUR N3800" | Bayer Material Science, Pittsburgh, PA |
| TiO$_2$ Pigment | Titanium dioxide | Kronus, Inc., Dallas, TX |
| T10 | T10 release liner | Solutia, Inc. (St Louis, MO, USA) |
| HOSTAPHAN 3SAB | Polyetheylene terepthalate (PET) film, available under the trade designation "HOSTAPHAN 3SAB" | Mitsubishi Polyester Film, Inc. (Greer, SC, USA) |
| 467MP ADHESIVE TRANSFER TAPE | A transfer tape available under the trade designation "467MP ADHESIVE TRANSFER TAPE" | 3M Company (St. Paul, MN, USA) |
| Fumed Silica | HDK ® H15 Pyrogenic Silica | Wacker Chemie AG (Munich, Germany) |

Test Method 1: 70° C. Peel Adhesion to Polycarbonate (PC)

(A) Sample Preparation

The cured (meth)acrylic polyvinyl butyral films were heat laminated onto a polycarbonate/polybutylene terephthalate (PC/PBT) film (BAYFOL® CR 210 000000, Bayer Material Science, 7 mil (178 micrometers) thick) and then cut into 0.5 inch (1.27 cm) by 4 inch (10.16 cm) strips and heat laminated to 2 inch (5.08 cm) by 4 inch (10.16 cm) polycarbonate panel (EXL 1132T Resin, available from Sabic Innovative Plastics, Pittsfield, Mass.). Both lamination steps used a heat bonder under the trade designation "CERATEK (Model 12ASL/1)" by Sencorp White Company, Hyannis, Mass., with temperature setting at 285° F. (140° C.) on the top platen and 158° F. (70° C.) on the bottom platen for 30 seconds at a pressure of 10 PSI (0.689 MPa). The actual temperature of the bondline was 120° C. as measured by a thermocouple.

(B) 70° C. Peel Adhesion Testing

90 Degree peel performance of the heat laminated films of (A) was measured according to ASTM D6862-11 with a test rate of 12 in/min (30.48 cm/min). The sample size was 0.5 inch (1.27 cm) width by 4.0 inches (10.16 cm) length on PC substrates at room temperature ("RT") and 70° C. The samples tested at 70° C. were equilibrated in the oven for at least 15 minutes before peeling. The average peel strength was reported for each sample in lbf/inch and converted to kg/cm.

Test Method 2: 180° Peel Adhesion to Stainless Steel after Heat Treatment

Examples of heat bondable films that were coated and cured on HOSTAPHAN 3SAB primed PET were tested to determine their peel adhesions on stainless steel. Each sample, 2 layer film construction was cut into 2 samples strips, 1 inch (2.54 cm) by 10 inches (25.4 cm) in dimension. Stainless steel panels were washed once with acetone, three times with n-heptane, and allowed to dry. Samples were rolled down with a 4.5 lb (2.04 kg) mechanical roller onto steel panels and placed in a 300° F. (148.9° C.) oven for 10 minutes. Samples were allowed to cool to room temperature for 2 hours. Heat bondable 2 layer film constructions were then peeled from stainless steel panels at 180° peel angle on an IMASS SP-2100 slip/peel tester from Instrumentors, Inc. (Strongsville, Ohio) at a rate of 12"/min. Peel adhesion values were averaged for each example, recorded in oz/in, and converted to N/dm.

Test Method 3: 180° Peel Adhesion to Stainless Steel without Heat Treatment

Examples of heat bondable films that were coated and cured on HOSTAPHAN 3SAB primed PET were tested to determine their peel adhesions on stainless steel. Each example 2 layer film construction was cut into 2 samples strips, 1 inch (2.54 cm) by 10 inches (25.4 cm) in dimension. Stainless steel panels were washed once with acetone, three times with n-heptane, and allowed to dry. Samples were rolled down with a 4.5 lb (2.04 kg) mechanical roller onto steel panels and were dwelled at room temperature for 2 hours. Heat bondable 2 layer film constructions were then peeled from stainless steel panels at 180° peel angle on an IMASS SP-2100 slip/peel tester from Instrumentors, Inc. (Strongsville, Ohio) at a rate of 12"/min. Peel adhesion values were averaged for each example, recorded in oz/in, and converted to N/dm.

Test Method 4: Determination of Tensile Storage Modulus (E')

The examples were analyzed by Dynamic Mechanical Analysis (DMA) using a DMAQ800 from TA Instruments in tensile mode to characterize the physical properties of each sample as a function of temperature. Rectangular samples, 6.2 mm wide and 0.05-0.07 mm thick, were clamped into the film tension clamps of the instrument at 17-19 mm length. The furnace was closed and the temperature was equilibrated at −50° C. and held for 5 minute. The temperature was then ramped from −50° C. to 50° C. at 2° C./min while the sample was oscillated at a frequency of 1 Hertz and a constant strain of 0.1 percent. While many physical parameters of the material were recorded during the temperature ramp, tensile storage modulus (E') was of primary importance and its value at 25° C. was recorded in MPa.

Test Method 5: Differential Scanning Calorimetry

DSC was performed on a MODEL Q2000 DSC instrument (TA Instruments Inc., New Castle, Del., USA). DSC samples were typically 6 to 20 milligrams. Testing was done in sealed, aluminum, T-zero sample pans. For each sample analysis, pans were individually placed on one of the differential posts in the DSC's enclosed cell along with an empty reference pan on the opposite post. Over the course of the test the temperature was raised to 150° C., lowered to −85° C., equilibrated for 2 minutes, and then raised to 150° C. All temperature changes were carried out at 20° C./min except for Examples 55 and 56 that were carried out at 5° C./min. The second heating cycle was used to determine the Tg, referring to the midpoint temperature, described as $T_{mg}$ in ASTM D3418-12.

Test Method 6: Tensile Strength and Elongation Test

Tensile and elongation testing was conducted according to ASTM D882-10 (unless specified otherwise) utilizing an INSTRON MODEL 4500 UNIVERSAL TESTING SYSTEM with a 1 kN load cell. Testing was performed at a rate of 300 mm/minute (11.81 inches/minute) for a total distance of 250 mm (9.84 inches). Samples were tested at least 24 hours after being prepared. A 0.5" (~1.3 cm) wide strip of film was cut, and the thickness was determined for each sample using a micrometer. Typical sample length is 5-7 cm (2-3 inches). Test results were reported as the average of 3-5 sample replicates. The tensile strength (nominal) and percent elongation at break were determined, as described by 11.3 and 11.5 of ASTM D882-10.

Heat Bondable Films (HBF) Made with DPA as a Crosslinker

Example 1

The base formulation was made by combining 270 grams (81.3 wt. %) of IOA, 30 grams (9.3 wt. %) of AA, 24 grams (7.4 wt. %) of B60HH, and 1.05 gram (0.32 phr) of IRGACURE 651 in a glass quart jar and mixing with a NETZSCH MODEL 50 DISPERSATOR until clear and homogeneous. Film was made by combining 50 grams of base formulation and a quantity of DPA according to Table 2 in a smaller jar, rolling overnight, coating onto a release liner at a 2 mil (50.8 micrometer) thickness, and curing under a nitrogen atmosphere with 559 mJ/cm$^2$ of UV A light over 2 minutes. Thus, the thickness of the resulting cured film was 2 mils (50.8 micrometer).

Examples 2-4

The base formulation was made by combining 540 grams (81.8 wt. %) of IOA, 60 grams (9.1 wt. %) of AA, 60 grams (9.1 wt. %) of B60HH, and 2.1 grams (0.32 phr) of IRGACURE 651 in a glass quart jar and mixing with a NETZSCH MODEL 50 DISPERSATOR until clear and homogeneous.

Example 2 was made by combining 50 grams of base formulation and a quantity of DPA according to Table 2 in a smaller jar, rolling overnight, and coating and curing as described above.

Example 3 was made in the same fashion as Example 2 except that 0.5 gram (1.0 phr) of D11A was added in addition to the DPA ahead of rolling overnight.

Example 4 was made in the same fashion as Example 2 except that 0.5 gram (1.0 phr) of D12A was added in addition to the DPA ahead of rolling overnight.

Example 5

The base formulation was made by combining 277.5 grams (84.1 wt. %) of IOA, 22.5 grams (6.8 wt. %) of AA, 30 grams (9.1 wt. %) of B60HH, and 1.05 gram (0.32 phr) of IRGACURE 651 in a glass quart jar and mixing with a NETZSCH MODEL 50 DISPERSATOR until clear and homogeneous. Film was made by combining 50 grams of base formulation and a quantity of DPA according to Table 2 in a smaller jar, rolling overnight, and coating and curing as described above.

Example 6

The base formulation was made by combining 270 grams (81.8 wt. %) of IOA, 30 grams (9.1 wt. %) of AA, 30 grams (9.1 wt. %) of B60HH, and 1.05 gram (0.32 phr) of IRGACURE 651 in a glass quart jar and mixing with a NETZSCH MODEL 50 DISPERSATOR until clear and homogeneous. Film was made by combining 50 grams of base formulation and a quantity of DPA according to Table 2 in a smaller jar, rolling overnight, and coating and curing as described above.

Example 7

The base formulation was made by combining 270 grams (80.6 wt. %) of IOA, 30 grams (9.0 wt. %) of AA, 35 grams (10.4 wt. %) of B60HH, and 1.05 gram (0.32 phr) of IRGACURE 651 in a glass quart jar and mixing with a NETZSCH MODEL 50 DISPERSATOR until clear and homogeneous. Film was made by combining 50 grams of base formulation and a quantity of DPA according to Table 2 in a smaller jar, rolling overnight, and coating and curing as described above.

Examples 8-12

The base formulation was made by combining 540 grams (79.6 wt. %) of IOA, 60 grams (8.8 wt. %) of AA, 78 grams (11.5 wt. %) of B60HH, and 2.1 grams (0.31 phr) of IRGACURE 651 in a glass quart jar and mixing with a NETZSCH MODEL 50 DISPERSATOR until clear and homogeneous.

Examples 8-10 were made by combining 50 grams of base formulation and a quantity of DPA according to Table 2 in a smaller jar, rolling overnight, and coating and curing as described above.

Example 11 was made in the same fashion as Example 8 except that 0.5 gram (1.0 phr) of D11A was added in addition to the DPA ahead of rolling overnight.

Example 12 was made in the same fashion as Example 8 except that 0.5 gram (1.0 phr) of D12A was added in addition to the DPA ahead of rolling overnight.

Example 13

The base formulation was made by combining 270 grams (76.9 wt. %) of IOA, 30 grams (8.5 wt. %) of AA, 51 grams (14.5 wt. %) of B60HH, and 1.05 gram (0.30 phr) of IRGACURE 651 in a glass quart jar and mixing with a NETZSCH MODEL 50 DISPERSATOR until clear and homogeneous. Film was made by combining 50 grams of base formulation and a quantity of DPA according to Table 2 in a smaller jar, rolling overnight, and coating and curing as described above.

Examples were tested according to Test Method 1. Additionally, Examples 1, 4, 5, 7, and 13 were tested according to Test Method 4, and Examples 2, 6, 9, 11, and 13 were tested according to Test Method 5.

TABLE 2

Properties of Heat Bondable Films made using DPA as a crosslinker

| Example # | IOA (wt. %) | AA (wt. %) | B60HH (wt. %) | DPA (g) | DPA (phr) | RT Peel Adhesion (lbf/in, kg/cm) | 70° C. Peel Adhesion (lbf/in, kg/cm) | E' at 25° C. (MPa) | Tg (° C.) |
|---|---|---|---|---|---|---|---|---|---|
| 1 | 83.3 | 9.3 | 7.4 | 1.0 | 2 | 11.0, 1.96 | 16.1, 2.88 | 5.25 | n.m. |
| 2 | 81.8 | 9.1 | 9.1 | 0.5 | 1 | 9.9, 1.77 | 16.2, 2.89 | n.m. | −40.6 |
| 3 | 81.8 | 9.1 | 9.1 | 0.5 | 1 | 8.7, 1.55 | 14.7, 2.63 | n.m. | −38.3 |
| 4 | 81.8 | 9.1 | 9.1 | 0.5 | 1 | 8.9, 1.59 | 16.6, 2.96 | 6.18 | −37.7 |
| 5 | 84.1 | 6.8 | 9.1 | 1.0 | 2 | 4.5, 0.80 | 16.5, 2.95 | 48.95 | −37.8 |
| 6 | 81.8 | 9.1 | 9.1 | 1.0 | 2 | 9.5, 1.70 | 21.0, 3.75 | n.m. | −33.9 |
| 7 | 80.6 | 9.0 | 10.4 | 1.0 | 2 | 9.3, 1.66 | 20.0, 3.57 | 12.70 | n.m. |
| 8 | 79.6 | 8.8 | 11.5 | 1.0 | 2 | 9.7, 1.73 | 19.2, 3.43 | n.m. | n.m. |
| 9 | 79.6 | 8.8 | 11.5 | 1.5 | 3 | 7.9, 1.41 | 17.4, 3.11 | n.m. | −31.9 |
| 10 | 79.6 | 8.8 | 11.5 | 2.0 | 4 | 7.3, 1.30 | 15.9, 2.84 | n.m. | n.m. |
| 11 | 79.6 | 8.8 | 11.5 | 1.0 | 2 | 8.3, 1.48 | 16.9, 3.02 | n.m. | −32.4 |
| 12 | 79.6 | 8.8 | 11.5 | 1.0 | 2 | 8.6, 1.54 | 22.0, 3.93 | n.m. | n.m. |
| 13 | 76.9 | 8.5 | 14.5 | 1.0 | 2 | 7.1, 1.27 | 14.1, 2.52 | 36.50 | −37.8 | n.m.—not measured

Heat Bondable Films (HBF) Made with T1 as a Crosslinker

Example 14

The base formulation was made by combining 270 grams (81.3 wt. %) of IOA, 30 grams (9.3 wt. %) of AA, 24 grams (7.4 wt. %) of B60HH, and 1.05 gram (0.32 phr) of IRGACURE 651 in a glass quart jar and mixing with a NETZSCH MODEL 50 DISPERSATOR until clear and homogeneous. Film was made by combining 50 grams of base formulation and a quantity of T1 according to Table 3 in a smaller jar, rolling overnight, coating onto a release liner at a 2 mil (50.8 micrometer) thickness, and curing under a nitrogen atmosphere with 559 mJ/cm$^2$ of UV A light over 2 minutes.

Examples 15-19

Example 15 was made in the same fashion as Example 14 except the composition of the base formulation was 277.5 grams (84.1 wt. %) of IOA, 22.5 grams (6.8 wt. %) of AA, 30 grams (9.1 wt. %) of B60HH, and 1.05 gram (0.32 phr) of IRGACURE 651.

Example 16 was made in the same fashion as Example 14 except the composition of the base formulation was 270 grams (81.8 wt. %) of IOA, 30 grams (9.1 wt. %) of AA, 30 grams (9.1 wt. %) of B60HH, and 1.05 gram (0.32 phr) of IRGACURE 651.

Example 17 was made in the same fashion as Example 14 except the composition of the base formulation was 277.5 grams (81.9 wt. %) of IOA, 22.5 grams (6.6 wt. %) of AA, 39 grams (11.5 wt. %) of B60HH, and 1.05 gram (0.32 phr) of IRGACURE 651.

Example 18 was made in the same fashion as Example 14 except the composition of the base formulation was 270 grams (79.6 wt. %) of IOA, 30 grams (8.8 wt. %) of AA, 39 grams (11.5 wt. %) of B60HH, and 1.05 gram (0.31 phr) of IRGACURE 651.

Example 19 was made in the same fashion as Example 14 except the composition of the base formulation was 270 grams (76.9 wt. %) of IOA, 30 grams (8.5 wt. %) of AA, 51 grams (14.5 wt. %) of B60HH, and 1.05 gram (0.30 phr) of IRGACURE 651.

Examples were tested according to Test Method 1. Additionally, Example 16 was tested according to Test Method 5.

Examples 21-23

Example 21 was made in the same fashion as Example 20 except the composition of the base formulation was 270 grams (81.8 wt. %) of IOA, 30 grams (9.1 wt. %) of AA, 30 grams (9.1 wt. %) of B60HH, and 1.05 gram (0.32 phr) of IRGACURE 651.

Example 22 was made in the same fashion as Example 20 except the composition of the base formulation was 262.5 grams (79.5 wt. %) of IOA, 37.5 grams (11.4 wt. %) of AA, 30 grams (9.1 wt. %) of B60HH, and 1.05 gram (0.32 phr) of IRGACURE 651.

Example 23 was made in the same fashion as Example 20 except the composition of the base formulation was 270

TABLE 3

Properties of Heat Bondable Films made using T1 as a crosslinker

| Example # | IOA (wt. %) | AA (wt. %) | B60HH (wt. %) | T1 (g) | T1 (phr) | RT Peel Adhesion (lbf/in, kg/cm) | 70° C. Peel Adhesion (lbf/in, kg/cm) | Tg (° C.) |
|---|---|---|---|---|---|---|---|---|
| 14 | 83.3 | 9.3 | 7.4 | 0.1 | 0.2 | 10.1, 1.80 | 16.4, 2.93 | n.m. |
| 15 | 84.1 | 6.8 | 9.1 | 0.1 | 0.2 | 6.2, 1.11 | 4.5, 2.59 | n.m. |
| 16 | 81.8 | 9.1 | 9.1 | 0.1 | 0.2 | 9.2, 1.64 | 5.8, 2.82 | −38.4 |
| 17 | 81.9 | 6.6 | 11.5 | 0.1 | 0.2 | 4.8, 0.86 | 16.1, 2.88 | n.m. |
| 18 | 79.6 | 8.8 | 11.5 | 0.1 | 0.2 | 11.9, 2.13 | 15.2, 2.71 | n.m. |
| 19 | 76.9 | 8.5 | 14.5 | 0.1 | 0.2 | 11.1, 1.98 | 4.8, 2.64 | n.m. | n.m. not measured

Heat Bondable Films (HBF) Made with HDDA as a Crosslinker

Example 20

The base formulation was made by combining 277.5 grams (84.1 wt. %) of IOA, 30 grams (6.8 wt. %) of AA, 30 grams (9.1 wt. %) of B60HH, and 1.05 gram (0.32 phr) of IRGACURE 651 in a glass quart jar and mixing with a Netzsch Model 50 Dispersator until clear and homogeneous. Film was made by combining 50 grams of base formulation and a quantity of HDDA according to Table 4 in a smaller jar, rolling overnight, coating onto a release liner at a 2 mil (50.8 micrometer) thickness, and curing under a nitrogen atmosphere with 559 mJ/cm² of UV A light over 2 minutes.

grams (80.6 wt. %) of IOA, 30 grams (9.0 wt. %) of AA, 35 grams (10.4 wt. %) of B60HH, and 1.05 gram (0.31 phr) of IRGACURE 651.

Examples were tested according to Test Method 1. Additionally, Example 23 was tested according to Test Method 5.

TABLE 4

Properties of HBFs made using HDDA as a crosslinker

| Example # | IOA (wt. %) | AA (wt. %) | B60HH (wt. %) | HDDA (g) | HDDA (phr) | RT Peel Adhesion (lbf/in, kg/cm) | 70° C. Peel Adhesion (lbf/in, kg/cm) | Tg (° C.) |
|---|---|---|---|---|---|---|---|---|
| 20 | 84.1 | 6.8 | 9.1 | 0.05 | 0.1 | 6.8, 1.21 | 18.4, 3.29 | n.m. |
| 21 | 81.8 | 9.1 | 9.1 | 0.05 | 0.1 | 5.4, 0.96 | 22.6, 4.04 | n.m. |
| 22 | 79.5 | 11.4 | 9.1 | 0.05 | 0.1 | 5.6, 1.00 | n.m. | n.m. |
| 23 | 80.6 | 9.0 | 10.4 | 0.05 | 0.1 | 10.0, 1.79 | 20.9, 3.73 | −37.5 | n.m. not measured

Heat Bondable Films Made with B30HH

Examples 24-26

The base formulation was made by combining 540 grams (81.8 wt. %) of IOA, 60 grams (9.1 wt. %) of AA, 60 grams (9.1 wt. %) of B30HH, and 2.1 grams (0.32 phr) of IRGACURE 651 in a glass quart jar and mixing with a NETZSCH MODEL 50 DISPERSATOR until clear and homogeneous. Tapes 24, 25, and 26 were made by combining 100 grams of base formulation and a quantity of crosslinker according to Table 5 in a smaller jar, rolling overnight, coating onto a release liner at 2 mil (50.8 micrometer) thickness, and curing under a nitrogen atmosphere with 559 mJ/cm$^2$ of UV A light over 2 minutes.

Examples 27-29

The base formulation was made by combining 540 grams (79.4 wt. %) of IOA, 60 grams (8.8 wt. %) of AA, 78 grams (11.5 wt. %) of B30HH, and 2.1 grams (0.32 phr) of IRGACURE 651 in a glass quart jar and mixing with a NETZSCH MODEL 50 DISPERSATOR until clear and homogeneous. Tapes 27, 28, and 29 were made by combining 100 grams of base formulation and a quantity of crosslinker according to Table 5 in a smaller jar, rolling overnight, coating onto a release liner at 2 mil (50.8 micrometer) thickness, and curing under a nitrogen atmosphere with 559 mJ/cm$^2$ of UV A light over 2 minutes.

Examples 24-29 were tested according to Test Methods 1 and 5. Additionally, Example 27 was tested according to Test Method 4.

TABLE 5

Properties of HBFs with B30HH

| Example # | Crosslinker | Crosslinker (g) | Crosslinker (phr) | RT Peel Adhesion (lbf/in, kg/cm) | 70° C. Peel Adhesion (lbf/in, kg/cm) | E' at 25° C. (MPa) | Tg (° C.) |
|---|---|---|---|---|---|---|---|
| 24 | DPA | 2.0 | 2.0 | 12.4, 2.21 | 19.0, 3.38 | n.m. | −35.9 |
| 25 | HDDA | 0.1 | 0.1 | 10.4, 1.85 | 20.2, 3.59 | n.m. | −38.2 |
| 26 | T1 | 0.1 | 0.1 | 11.4, 2.03 | 21.5, 3.83 | n.m. | −38.0 |
| 27 | DPA | 2.0 | 2.0 | 9.6, 1.71 | 20.2, 3.59 | 9.84 | −35.4 |
| 28 | HDDA | 0.1 | 0.1 | 10.7, 1.90 | 19.3, 3.43 | n.m. | −38.3 |
| 29 | T1 | 0.1 | 0.1 | 14.2, 2.53 | 19.1, 3.40 | n.m. | −39.4 | n.m. not measured

Heat Bondable Films with Backing (2 Layer Film Constructions)

Examples 30-34

The base formulation was made by combining 540 grams (81.8 wt. %) of IOA, 60 grams (9.1 wt. %) of AA, 60 grams (9.1 wt. %) of B60HH, and 2.1 grams (0.32 phr) of IRGACURE 651 in a glass quart jar and mixing with a NETZSCH MODEL 50 DISPERSATOR until clear and homogeneous. Tapes 30, 32, and 34 were made by combining 100 grams of base formulation and a quantity of crosslinker according to Table 6 in a smaller jar, rolling overnight, coating onto HOSTAPHAN 3SAB primed PET at 2 mil (50.8 micrometer) thickness, and curing under a nitrogen atmosphere with 559 mJ/cm$^2$ of UV A light over 2 minutes.

Example 31 was made in the same fashion as Example 24 except that 1.0 gram (1.0 phr) of D12A was added in addition to the crosslinker ahead of rolling overnight.

Example 33 was made in the same fashion as Example 26 except that 1.0 gram (1.0 phr) of D12A was added in addition to the crosslinker ahead of rolling overnight.

Examples 35-38

The base formulation was made by combining 540 grams (81.8 wt. %) of 2OA, 60 grams (9.1 wt. %) of AA, 60 grams (9.1 wt. %) of B60HH, and 2.1 grams (0.32 phr) of IRGACURE 651 in a glass quart jar and mixing with a NETZSCH MODEL 50 DISPERSATOR until clear and homogeneous. Tapes 35-38 were made by combining 100 grams of base formulation and a quantity of crosslinker according to Table 6 in a smaller jar, rolling overnight, coating onto HOSTAPHAN 3SAB primed PET at a 2 mil (50.8 micrometer) thickness, and curing under a nitrogen atmosphere with 559 mJ/cm$^2$ of UV A light over 2 minutes.

Example 39

The film formulation was made by combining 856 grams (24.0 wt. %) of EHA, 640 grams (32.0 wt %) of IBOA, 358 grams (10.0 wt. %) of HEA, 358 grams (10.0 wt %) of AA, 600 grams (16.8 wt %) of B60H, 250 grams (7.0 wt %) of CN965, 7.13 grams (0.20 wt. %) of IRGACURE 651 in a glass gallon jar and mixed with a NETZSCH MODEL 50 DISPERSATOR until clear and homogeneous. The heat bondable formulation was made by combining 79.2 grams (79.2 wt. %) of IOA, 8.8 grams (8.8 wt. %) of AA, 8.8 grams (8.8 wt. %) of B60HH, 2.9 grams (2.9 wt %) of DPA and 0.3 gram (0.3 phr) of 651 in a glass quart jar and mixing with a NETZSCH MODEL 50 DISPERSATOR until clear and homogeneous. The film formulation was then coated between a release liners at 2 mil (50.8 micrometer) thickness, and cured with 1,824 mJ/cm$^2$ of UV A light over 3.8 minutes. The heat bondable formulation was then coated directly between the cured film formulation and a release liner at 2 mil (50.8 micrometer) thickness, and curing with 1,200 mJ/cm$^2$ of UV A light over 5 minutes.

Comparative Example C1

467MP ADHESIVE TRANSFER TAPE (2.3 mil, 58.4 micrometers) was laminated to HOSTAPHAN 3SAB PET.

Examples 30-39 and C1 were tested according to Test Method 2 (TM2) and Test Method 3 (TM3).

TABLE 6

Properties of HBFs as a part of 2 layer constructions

| Example # | Crosslinker | Crosslinker (g) | Crosslinker (phr) | RT Peel Adhesion with Heat (oz/in, N/dm) TM 2 | RT Peel Adhesion Without Heat (oz/in, N/dm) TM 3 |
|---|---|---|---|---|---|
| 30 | DPA | 2.0 | 2 | 88.5, 96.9 | 6.3, 6.7 |
| 31 | DPA | 2.0 | 2 | 69.5, 76.1 | 1.1, 1.2 |
| 32 | HDDA | 0.1 | 0.1 | 63.6, 69.6 | 2.1, 2.3 |
| 33 | HDDA | 0.1 | 0.1 | 64.0, 70.0 | 1.1, 1.2 |
| 34 | T1 | 0.1 | 0.1 | 93.1, 101.9 | 6.3, 6.7 |
| 35 | DPA | 2.0 | 2.0 | 55.6, 60.9 | 0.2, 0.22 |
| 36 | T1 | 0.1 | 0.1 | 122.3, 133.9 | 0.4, 0.44 |
| 37 | TMPDE | 1.0 | 1.0 | 46.7, 51.1 | 0.2, 0.22 |
| 38 | DVTD | 1.0 | 1.0 | 63.7, 69.7 | 0.2, 0.22 |
| 39 | DPA | 2.9 | 2.9 | 40.7, 44.5 | 0.1, 0.11 |
| C1 | n/a | n/a | n/a | 127.8, 139.9 | 67.0, 73.3 | n/a—not applicable

Heat Bondable Films Made with B30HH in 2 Layer Film Constructions

Examples 40-42

The base formulation was made by combining 540 grams (81.8 wt. %) of IOA, 60 grams (9.1 wt. %) of AA, 60 grams (9.1 wt. %) of B30HH, and 2.1 grams (0.32 phr) of IRGACURE 651 in a glass quart jar and mixing with a NETZSCH MODEL 50 DISPERSATOR until clear and homogeneous. Tapes were made by combining 100 grams of base formulation and a quantity of crosslinker according to Table 7 in a smaller jar, rolling overnight, coating onto HOSTAPHAN 3SAB primed PET at 2 mil (50.8 micrometer) thickness, and curing under a nitrogen atmosphere with 559 mJ/cm$^2$ of UV A light over 2 minutes.

Examples 43-45

The base formulation was made by combining 540 grams (79.4 wt. %) of IOA, 60 grams (8.8 wt. %) of AA, 78 grams (11.5 wt. %) of B30HH, and 2.1 grams (0.32 phr) of IRGACURE 651 in a glass quart jar and mixing with a NETZSCH MODEL 50 DISPERSATOR until clear and homogeneous. Tapes were made by combining 100 grams of base formulation and a quantity of crosslinker according to Table 7 in a smaller jar, rolling overnight, coating onto HOSTAPHAN 3SAB primed PET at 2 mil (50.8 micrometer) thickness, and curing under a nitrogen atmosphere with 559 mJ/cm$^2$ of UV A light over 2 minutes.

Examples 40-45 were tested according to Test Method 2 (TM2) and Test Method 3 (TM3).

Example 42 was also tested according to Test Method 4 and was found to have a tensile storage modulus (E') of 16.5 MPa.

Heat Bondable Films Made with CAP in 2 Layer Film Constructions

Control Example 46

The base formulation was made by combining 270 g (81.8 wt. %) of IOA, 30 g (9.1 wt. %) of AA, 30 g (9.1 wt. %) of CAP, and 2.1 g (0.32 phr) of IRGACURE 651 in a glass quart jar. Solution was mixed with a NETZSCH MODEL 50 DISPERSATOR for 30 minutes at 3000 RPM, and then rolled for one week. Solution was not homogeneous or clear and was not tested further.

Control Examples 47 and 48

The base formulation was made by combining 270 grams (75.0 wt. %) of IOA, 30 grams (8.3 wt. %) of AA, 30 grams (8.3 wt. %) of HBA, 30 grams (8.3 wt. %) of CAP, and 1.15 gram (0.32 phr) of IRGACURE 651 in a glass quart jar and mixing with a NETZSCH MODEL 50 DISPERSATOR until clear and homogeneous. Tapes were made by combining 100 grams of base formulation and a quantity of crosslinker according to Table 8 in a smaller jar, rolling overnight, coating onto HOSTAPHAN 3SAB primed PET at 2 mil (50.8 micrometer) thickness, and curing under a nitrogen atmosphere with 559 mJ/cm$^2$ of UV A light over 2 minutes.

TABLE 7

Properties of HBFs made with B30HH as a part of 2 layer constructions

| Example # | Crosslinker | Crosslinker (g) | Crosslinker (phr) | RT Peel Adhesion with Heat (oz/in, N/dm) TM2 | RT Peel Adhesion without Heat (oz/in, N/dm) TM3 |
|---|---|---|---|---|---|
| 40 | DPA | 2.0 | 2 | 52.5, 57.5 | 1.6, 1.8 |
| 41 | HDDA | 0.1 | 0.1 | 49.9, 54.6 | 0.8, 0.9 |
| 42 | T1 | 0.1 | 0.1 | 86.3, 94.5 | 12.4, 13.6 |
| 43 | DPA | 2.0 | 2.0 | 24.0, 26.3 | 0.6, 0.7 |
| 44 | HDDA | 0.1 | 0.1 | 34.4, 37.7 | 0.5, 0.55 |
| 45 | T1 | 0.1 | 0.1 | 92.8, 101.6 | 4.8, 5.3 |

Examples 47 and 48 were Tested According to Test Method 2.

TABLE 8

Properties of HBFs made with CAP as a part of 2 layer constructions

| Example # | Crosslinker | Crosslinker (g) | Crosslinker (phr) | RT Peel Adhesion with Heat (oz/in, N/dm) TM2 |
|---|---|---|---|---|
| 47 | DPA | 2.0 | 2 | 0.3, 0.33 |
| 48 | HDDA | 0.1 | 0.1 | 0.3, 0.33 |

Heat Bondable Films Made with PCL

Control Example 49

The base formulation was made by combining 270 grams (81.8 wt. %) of IOA, 30 grams (9.1 wt. %) of AA, 30 grams (9.1 wt. %) of PCL, and 2.1 grams (0.32 phr) of IRGACURE 651 in a glass quart jar. Solution was mixed with a NETZSCH MODEL 50 DISPERSATOR for 30 minutes at 3000 RPM, and then rolled for one week. Solution was not homogeneous or clear and was not tested further.

Control Example 50

The base formulation was made by combining 270 grams (75.0 wt. %) of IOA, 30 grams (8.3 wt. %) of AA, 30 grams (8.3 wt. %) of HBA, 30 grams (8.3 wt. %) of PCL, and 1.15 gram (0.32 phr) of IRGACURE 651 in a glass quart jar. Solution was mixed with a NETZSCH MODEL 50 DISPERSATOR for 30 minutes at 3000 RPM, and then rolled for one week. Solution was not homogeneous or clear and was not tested further.

Heat Bondable Films Made with PVP

Control Example 51

The base formulation was made by combining 270 grams (81.8 wt. %) of IOA, 30 grams (9.1 wt. %) of AA, 30 grams (9.1 wt. %) of PVP, and 2.1 grams (0.32 phr) of IRGACURE 651 in a glass quart jar. Solution was mixed with a NETZSCH MODEL 50 DISPERSATOR for 30 minutes at 3000 RPM, and then rolled for one week. Solution was not homogeneous or clear and was not tested further.

Control Example 52

The base formulation was made by combining 270 grams (75.0 wt. %) of IOA, 30 grams (8.3 wt. %) of AA, 30 grams (8.3 wt. %) of HBA, 30 grams (8.3 wt. %) of PVP, and 1.15 gram (0.32 phr) of IRGACURE 651 in a glass quart jar. Solution was mixed with a NETZSCH MODEL 50 DISPERSATOR for 30 minutes at 3000 RPM, and then rolled for one week. Solution was not homogeneous or clear and was not tested further.

Heat Bondable Films Made with PVAc

Control Example 53

The base formulation was made by combining 270 grams (81.8 wt. %) of IOA, 30 grams (9.1 wt. %) of AA, 30 grams (9.1 wt. %) of PVAc, and 2.1 grams (0.32 phr) of IRGA-CURE 651 in a glass quart jar. Solution was mixed with a NETZSCH MODEL 50 DISPERSATOR for 30 minutes at 3000 RPM, and then rolled for one week. Solution was not homogeneous or clear and was not tested further.

Control Example 54

The base formulation was made by combining 270 grams (75.0 wt. %) of IOA, 30 grams (8.3 wt. %) of AA, 30 grams (8.3 wt. %) of HBA, 30 grams (8.3 wt. %) of PVAc, and 1.15 gram (0.32 phr) of IRGACURE 651 in a glass quart jar. Solution was mixed with a NETZSCH MODEL 50 DISPERSATOR for 30 minutes at 3000 RPM, and then rolled for one week. Solution could be made clear and homogeneous with gentle heating. Solution was allowed to cool to room temperature, and became hazy and unhomogeneous as it cooled. Solution was not tested further.

Examples 55-56

Mixtures of monomers, PVB polymer, and other components were added to quart jars. The jars and contents were placed in a MAX 20 WHITE SPEEDMIXER (available from FleckTek, Inc., Landrum, S.C.) and mixed at 3500 RPM for 1 minute. The mixture was degassed at −20 inches of mercury (−6.8 kPa) for 5 minutes.

IRG 651 photoinitiator in an amount ranging from about 0.15 to 0.25 wt-% was added. The mixtures of Examples 1-11 were coated at a thickness ranging from about 1.5 to 12 mils between untreated PET liners and under a nitrogen atmosphere cured by exposure to a UV-A light source having a UV-A maximum in the range of 350-400 nm for 228 seconds. The total energy was measured using a Powermap™ radiometer equipped with a low intensity sensing head (available from EIT Inc., Sterling, Va.) and was 1824 mJ/cm$^2$ for each of these examples.

| Ex. | Low Tg Monomer | High Tg Monomer IBOA | Nitrogen Monomer | Polar Monomer | PVB B60H | Crosslinker |
|---|---|---|---|---|---|---|
| 55 | 2-EHA 31.5 | 23.6 | NVP 23.6 | CD9055 0.2 | 19.7 | CN963B80 1.1 |
| 56 | 2-EHA 23.0 | 3.2 | NVP 15.4 | AA 11.6 HEA 25.0 | 15.4 | CN963B80 2.0 Desmodur N3800 4.4 |

The composition of Example 56 contained 96 wt-% of the (meth)acrylic polymer having the wt-% of polymerized units specified in that table and 13 wt-% TiO$_2$.

The films were subjected to DSC as well as Tensile Strength and Elongation at Break testing, as previously described. The results are reported as follows:

| Example | Tg (° C.) | Tensile Strength (MPa) | Elongation at Break |
|---|---|---|---|
| 55 | 26.8 | 23.7 | 191 |
| 56 | 26.4 | 20.7 | 139 |

Examples 55 and 56 are illustrative films that can be utilized as a replacement for polyvinyl chloride films and are not heat bondable at the conditions previously described.

Heat Bondable Films Made with Fumed Silica

Examples 57-58

Formulations 57 and 58 were made by combining 241.8 grams (80.6 wt. %) of IOA, 27 grams (9.0 wt. %) of AA, 31.2 grams (10.4 wt. %) of B60HH, 6 grams (2.0 wt. %) DPA, 1.0 grams (0.33 phr) of IRGACURE 651, and a quantity of fumed silica according to Table 12 were placed in a glass quart jar and mixed with a NETZSCH MODEL 50 DISPERSATOR until clear and homogeneous. Tapes 57 and 58 were coated onto a release liner at 2 mil (50.8 micrometer) thickness, and cured under a nitrogen atmosphere with 529 mJ/cm$^2$ of UV A light over 2 minutes.

Examples 57 and 58 were tested according to Test Methods 1, 4, and 5.

TABLE 12

Properties of HBFs with fumed silica

| Example # | Fumed silica (g) | Fumed Silica (wt. %) | RT Peel Adhesion (lbf/in, kg/cm) | 70° C. Peel Adhesion (lbf/in, kg/cm) | E' at 25° C. (MPa) | Tg (° C.) |
|---|---|---|---|---|---|---|
| 57 | 5.0 | 1.5 | 3.9, 0.7 | 4.5, 0.8 | 36.8 | −38.7 |
| 58 | 15.0 | 5.0 | 2.0, 0.4 | 4.3, 0.8 | 44.4 | −37.7 |

Heat Bondable Films Made with NNDMA

Examples 59-60

Formulation 59 was made by combining 241.8 grams (80.6 wt. %) of IOA, 27 grams (9.0 wt. %) of NNDMA, 31.2 grams (10.4 wt. %) of B60HH, 6 grams (2.0 wt. %) DPA, and 1.0 grams (0.33 phr) of IRGACURE 651 were placed in a glass quart jar and mixed with a NETZSCH MODEL 50 DISPERSATOR until clear and homogeneous. Tape 59 was coated onto a release liner at 2 mil (50.8 micrometer) thickness, and cured under a nitrogen atmosphere with 529 mJ/cm$^2$ of UV A light over 2 minutes.

Formulation 60 was made by combining 238.2 grams (79.6 wt. %) of IOA, 15 grams (5.0 wt. %) of NNDMA, 15 grams (5 wt. %) AA, 31.2 grams (10.4 wt. %) of B60HH, 6 grams (2.0 wt. %) DPA, and 1.0 grams (0.33 phr) of IRGACURE 651 were placed in a glass quart jar and mixed with a NETZSCH MODEL 50 DISPERSATOR until clear and homogeneous. Tape 60 was coated onto a release liner at 2 mil (50.8 micrometer) thickness, and cured under a nitrogen atmosphere with 529 mJ/cm$^2$ of UV A light over 2 minutes.

Examples 59 and 60 were tested according to Test Methods 1, 4, and 5.

TABLE 13

Properties of HBFs with NNDMA

| Example # | RT Peel Adhesion (lbf/in, kg/cm) | 70° C. Peel Adhesion (lbf/in, kg/cm) | E' at 25° C. (MPa) | Tg (° C.) |
|---|---|---|---|---|
| 59 | 0.9, 0.2 | 1.9, 0.3 | 42.0 | −42.5 |
| 60 | 1.5, 0.3 | 1.6, 0.3 | 50.5 | −40.5 |

Heat Bondable Films Made with IBOA

Example 61

Formulation 61 was made by combining 241.8 grams (80.6 wt. %) of IOA, 27 grams (9.0 wt. %) of IBOA, 27 grams (9 wt. %) of AA, 31.2 grams (10.4 wt. %) of B60HH, 6 grams (2.0 wt. %) DPA, and 1.0 grams (0.33 phr) of IRGACURE 651 were placed in a glass quart jar and mixed with a NETZSCH MODEL 50 DISPERSATOR until clear and homogeneous. Tape 61 was coated onto a release liner at 2 mil (50.8 micrometer) thickness, and cured under a nitrogen atmosphere with 529 mJ/cm$^2$ of UV A light over 2 minutes.

Example 61 were tested according to Test Methods 1, 4, and 5.

TABLE 14

Properties of HBFs with IBOA

| Example # | RT Peel Adhesion (lbf/in, kg/cm) | 70° C. Peel Adhesion (lbf/in, kg/cm) | E' at 25° C. (MPa) | Tg (° C.) |
|---|---|---|---|---|
| 61 | 3.2, 0.6 | 3.8, 0.7 | 36.0 | −32.7 |

Heat Bondable Films Made with EHA

Examples 62-63

Formulation 62 was made by combining 1200 grams (80.0 wt. %) of EHA, 150 grams (10.0 wt. %) of AA, 150 grams (10.0 wt. %) of B30HH, 30 grams (2.0 wt. %) DPA, and 4.46 grams (0.33 phr) of IRGACURE 651 were placed in a glass gallon jar and mixed with a NETZSCH MODEL 50 DISPERSATOR until clear and homogeneous. Tape 62 was coated onto a release liner at 2 mil (50.8 micrometer) thickness, and cured under a nitrogen atmosphere with 565 mJ/cm$^2$ of UV A light over 2 minutes.

Formulation 63 was made by combining 1200 grams (80.0 wt. %) of EHA, 150 grams (10.0 wt. %) of AA, 150 grams (10.0 wt. %) of B60HH, 30 grams (2.0 wt. %) DPA, and 4.46 grams (0.33 phr) of IRGACURE 651 were placed in a glass gallon jar and mixed with a NETZSCH MODEL 50 DISPERSATOR until clear and homogeneous. Tape 63 was coated onto a release liner at 2 mil (50.8 micrometer) thickness, and cured under a nitrogen atmosphere with 565 mJ/cm$^2$ of UV A light over 2 minutes.

Examples 62 and 63 were tested according to Test Methods 1, 4, and 5.

TABLE 14

Properties of HBFs with EHA

| Example # | PVB Used | RT Peel Adhesion (lbf/in, kg/cm) | 70° C. Peel Adhesion (lbf/in, kg/cm) | E' at 25° C. (MPa) | Tg (° C.) |
|---|---|---|---|---|---|
| 62 | B30HH | 9.6, 1.7 | 3.0, 0.5 | 37.8 | −47.0 |
| 63 | B60HH | 4.3, 0.8 | 3.0, 0.5 | 35.3 | −44.3 |

What is claimed is:

1. A film comprising:
(meth)acrylic polymer and 5 to 20 wt. % polyvinyl acetal resin comprising polymerized units having the following formula

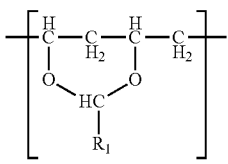

wherein R₁ is hydrogen or a C1-C7 alkyl group;

wherein the film has a tensile elastic modulus of at least 1 MPa at 25 C and 1 hertz and a Tg less than 30° C.

2. The film of claim 1 wherein the film comprises at least 25 wt-% and no greater than 85 wt. % of polymerized units of monofunctional alkyl (meth)acrylate monomer having a Tg of less than 0° C.

3. The film of claim 2 wherein the monofunctional alkyl (meth)acrylate monomer has a Tg of less than −10° C.

4. The film of claim 1 wherein the film comprises a bio-based content of at least 25% of the total carbon content.

5. The film of claim 1 wherein the film comprises polymerized units of an alkyl (meth)acrylate monomer having an alkyl group with 8 carbon atoms.

6. The film of claim 1 wherein the film further comprises up to 20 wt-% of polymerized units of a monofunctional alkyl (meth)acrylate monomer having a Tg greater than 40° C.

7. The film of claim 1 wherein the film further comprises at least 5 wt-% and no greater than 65 wt-% of polymerized units of polar monomers.

8. The film of claim 7 wherein polar monomers are selected from acid-functional, hydroxyl functional monomers, nitrogen-containing monomers, and combinations thereof.

9. The film of claim 1 wherein the film comprises polyvinyl butyral.

10. The film of claim 1 wherein the polyvinyl acetal resin has a polyvinyl alcohol content ranging from 10 to 30 wt-%.

11. The film of claim 1 wherein the polyvinyl acetal resin has a glass transition temperature ranging from 60° C. to 75° C.

12. The film of claim 1 wherein the polyacetal resin has an average molecular weight (Mw) ranging from 10,000 g/mole to 100,000 g/mole.

13. The film of claim 1 wherein the film further comprises polymerized units of a multifunctional crosslinker wherein the crosslinker is a traizine crosslinker or comprises functional groups selected from (meth)acrylate, alkenyl, and hydroxyl-reactive groups.

14. The film of claim 1 wherein the film further comprises additives in an amount no greater than 25 wt-%.

15. The film composition of claim 1 wherein the film composition comprises photoinitiator.

16. The film composition of claim 1 wherein the film comprises no greater than 10 wt-% of polymerized units of methacrylate monomers.

17. The film composition of claim 1 wherein the (meth) acrylic polymer is a random copolymer.

18. The film of claim 1 wherein the film is a monolithic film.

19. The film of claim 1 wherein the film is a film layer of a multilayer film.

20. The film of claim 1 wherein the film exhibits a single Tg as measured by Differential Scanning calorimetry.

21. The film of claim 1 wherein the film is heat bondable at a temperature from 50 to 150° C.

* * * * *